(12) United States Patent
Melville

(10) Patent No.: US 6,973,765 B2
(45) Date of Patent: Dec. 13, 2005

(54) APPARATUS AND PROCESS FOR MEAT PACKING

(75) Inventor: Richard Archer Melville, Auckland (NZ)

(73) Assignee: Machinery Development Limited (NZ)

( * ) Notice: Subject to any disclaimer, the term of this patent is extended or adjusted under 35 U.S.C. 154(b) by 0 days.

(21) Appl. No.: 10/232,018

(22) Filed: Aug. 30, 2002

(65) Prior Publication Data

US 2003/0054749 A1 Mar. 20, 2003

Related U.S. Application Data

(63) Continuation of application No. 09/917,098, filed on Jul. 26, 2001, now Pat. No. 6,443,828, which is a continuation of application No. 09/269,716, filed on Aug. 3, 1999, now Pat. No. 6,267,661.

(51) Int. Cl.[7] .............................. B65B 43/08; B65B 3/26
(52) U.S. Cl. .......................................... 53/456; 53/504
(58) Field of Search ..................... 53/493, 498, 500, 53/257, 202, 456, 502, 504, 505, 228, 385.1, 389.2, 267; 426/392

(56) References Cited

U.S. PATENT DOCUMENTS

| | | | |
|---|---|---|---|
| 3,490,830 A | | 1/1970 | Cooper |
| 3,872,644 A | * | 3/1975 | Giraudi et al. ................. 53/52 |
| 3,940,830 A | | 3/1976 | Anderson et al. |
| 4,090,275 A | | 5/1978 | Jorgensen et al. |
| 4,114,538 A | | 9/1978 | Nicodemus, Jr. et al. |
| 4,114,752 A | | 9/1978 | Schiek |
| 4,136,608 A | | 1/1979 | Gladd et al. |
| 4,189,273 A | | 2/1980 | Soderstrom et al. |
| 4,203,271 A | | 5/1980 | Raudat |
| 4,204,382 A | | 5/1980 | Guyonnet |
| 4,228,513 A | | 10/1980 | Doljack |
| 4,398,637 A | | 8/1983 | Fleury |
| 4,484,733 A | | 11/1984 | Loos et al. |
| 4,485,612 A | * | 12/1984 | Piesen et al. ................. 53/504 |
| 4,495,584 A | | 1/1985 | Yoshida |
| 4,509,123 A | | 4/1985 | Vereen |
| 4,542,808 A | | 9/1985 | Lloyd, Jr. et al. |
| 4,543,766 A | * | 10/1985 | Boshinski ..................... 53/64 |
| 4,544,318 A | | 10/1985 | Nagatomo et al. |
| 4,552,349 A | | 11/1985 | Loos et al. |
| 4,597,495 A | | 7/1986 | Knosby |
| 4,909,356 A | * | 3/1990 | Rimondi et al. ............... 186/61 |
| 6,363,690 B1 | * | 4/2002 | Lay et al. ..................... 53/410 |

* cited by examiner

Primary Examiner—John Paradiso
(74) Attorney, Agent, or Firm—McDermott Will & Emery LLP

(57) ABSTRACT

A method and apparatus for carrying out a meat packing process in which carcasses of animals (102) are weighed (100) and moved on a boning line (101) in sequence past a number of boning and trimming stations (103 and 105). The trimmed cuts are transferred to a main conveyor (108). The cuts are placed in bags dispensed by one or more machines (22) which produce bag's whose lengths and widths are matched to those of the cuts placed therein. Each hook (38) has a bar code (39), which is scanned at the boning stations. Feed conveyors (241–243) are controlled by the central processor (34). The travel of the main conveyor (108) is monitored by the central processor so that each position on the main conveyor to which the cuts are transferred from the feed conveyors is identified at each trimming station and at the bagging station. By this each bagged cut can be identified with the animal from which if was derived.

20 Claims, 26 Drawing Sheets

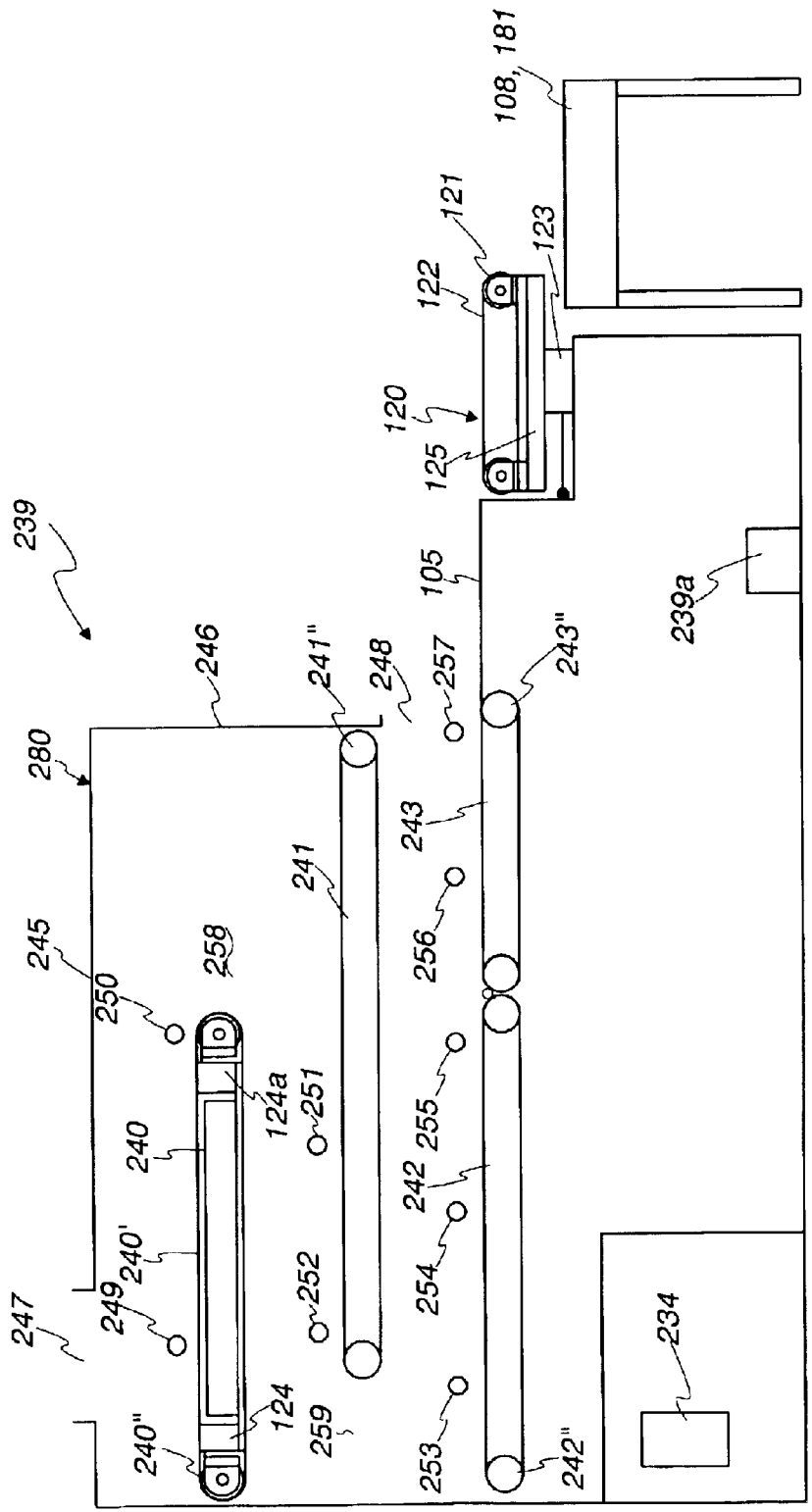

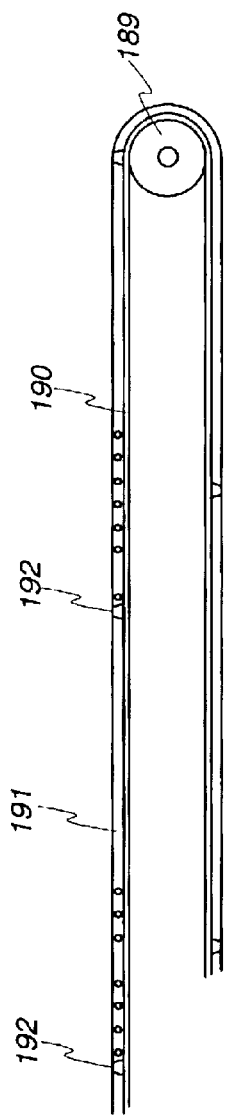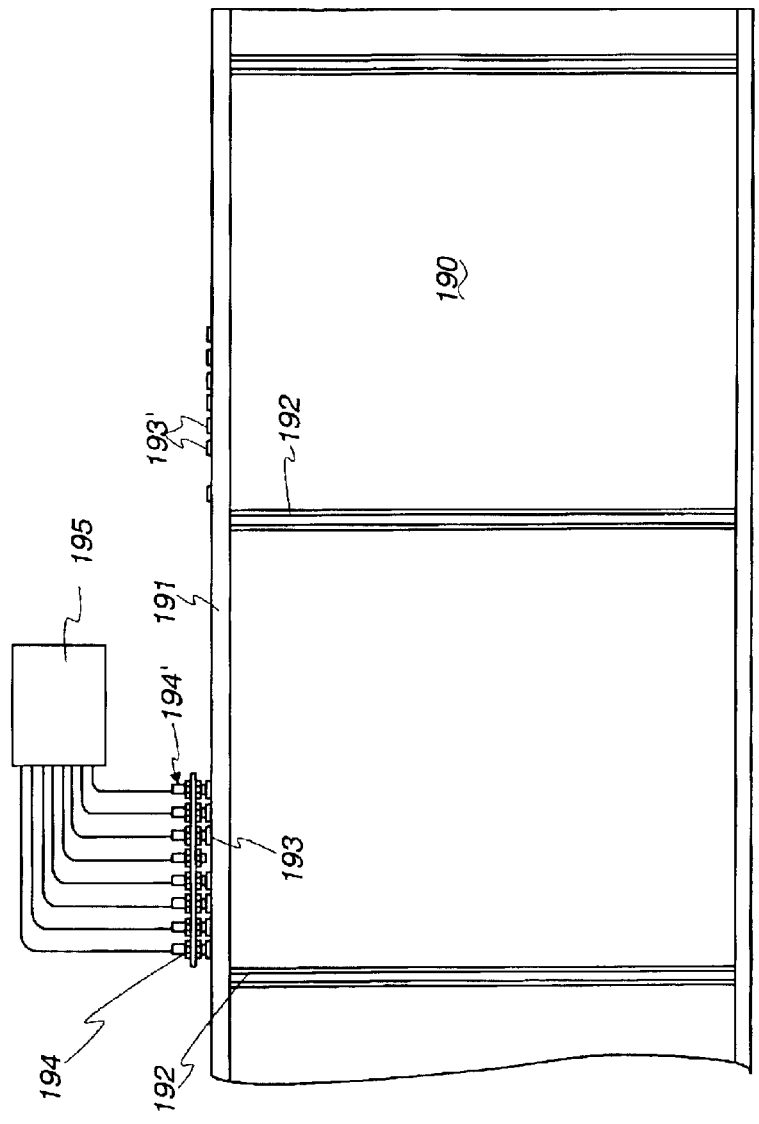
Fig. 19
Fig. 20

APPARATUS AND PROCESS FOR MEAT PACKING

This application is a continuation of U.S. Patent Application Ser. No. 09/917,098, filed on Jul. 26, 2001 now U.S. Pat. No. 6,443,828, which is a continuation of U.S. Patent Application Ser. No. 09/269,716, filed on Aug. 3, 1999, now U.S. Pat. No. 6,267,661.

FIELD OF THE INVENTION

This invention relates to the monitoring of cuts of meat which are removed from carcasses in meat packing plants.

In this specification, the term "cut" when used as a noun refers to a portion of a carcass which results from the dismemberment thereof into two or more parts.

The invention also relates to measuring various characteristics of the cuts of meat including their lengths, widths and weights. The cuts removed from carcasses, even cuts of the same type (such as loins, french racks etc) removed from animals of the same species, inevitably vary in size and weight from one cut to the next.

BACKGROUND OF THE INVENTION

The practice of selling carcasses (or perhaps forequarters and hindquarters) which have been cleaned but otherwise unimproved has been replaced in many meat packing plants in favour of a practice in which value is added to the products processed and typically comprises dismembering the carcasses into finished cuts which are packaged so that, when they leave the meat packing plant, they are ready for sale to the end user.

The applicant has devised machines which are located in the production line and which produce packages (usually bags) in which the finished cuts of meat are packaged. Each bag is produced as it is needed and its length can be selected by the operator to match the length of the cut which is to be packaged in that bag. Significant savings in the costs of packaging are being achieved in the commercial use of the machines. Examples of such machines are described in the applicant's international patent applications #PCT/EP92/01624 and PCT/NZ94/00024.

Despite these advances there is a need for greater efficiency in many meat packing plants. It is known for example that productivity is often adversely affected by poor trimming practices; i.e. saleable meat is often removed when the cuts are trimmed after they have been removed from the carcasses at the boning stations. One means which would be of assistance in identifying such wastage would be to compare the sum the weights of the cuts taken from each carcass with the weight of the carcass. Such information would also enable operators to have better knowledge of the quality of the animals which they have purchased for processing and to be more selective about the suppliers of their animals. The information would also enable farmers to improve breeding and feeding practices. Furthermore, a more detailed description of the contents of each package of meat could be provided.

However, the applicant has found that keeping track of the identity of the cuts after they leave the trimming tables is no easy matter in the operating environment of a meat packing plant.

SUMMARY OF THE INVENTION

According to one aspect of the invention there is provided a method of carrying out a meat packing process in which carcasses of animals which have been slaughtered are moved in order past a plurality of work stations at each of which cuts of preselected type are removed from the carcasses and transferred to a conveyor means arranged to move past the work stations and to carry cuts which are transferred to the conveyor means at the work stations to a remote locality, the method including the steps of transferring the cuts removed from the carcasses at each work station to the conveyor means in the order in which such cuts are so removed, and providing means for identifying each position on the conveyor means to which cuts are transferred attach work station, and for identifying each such position when such position has moved to the remote locality.

According to another aspect of the invention there is provided apparatus for use in a meat processing operation in which carcasses of animals which have been slaughtered are moved in order past a plurality of work stations at each of which cuts of preselected type are removed from the carcasses and transferred to a conveyor means arranged to move past the work stations and to carry cuts which are transferred to the conveyor means at the work stations to a remote locality and in which process the cuts removed from the carcasses at each work station are transferred to the conveyor means in the order in which such cuts are so removed, the apparatus including means for identifying each position on the conveyor means to which cuts are transferred at each work station, and means for identifying each such position when such position has moved to the remote locality.

In one form of the invention means is provided for identifying each carcass which is moved past the work stations with the animal from which such carcass was derived.

Advantageously, at each work station the cuts are trimmed after being removed from the carcasses and before being transferred to the conveyor means.

According to various further aspects of the invention means are provided for.

weighing each cut;

determining the sum of the weights of the cuts removed from each carcass;

weighing each cut before it has been trimmed and after it has been trimmed;

measuring the length of each cut, for producing packages for packaging the cuts at the remote location, and for causing the package producing means to vary the length of each package to suit the length of the cut to be packaged therein;

measuring the width of said each cut and for causing the package producing means to produce a package whose width is suited to the width of the cut to be packaged therein;

applying to each package information for identifying the time at which the cut or cuts was or were packaged therein; and applying to each package information for identifying the weight of the cut or cuts contained therein.

In meat packing plants, the provision of means which enables each cut to be identified with the carcass from which the cut was removed is of substantial significance. In the first place, by collating the weights of all trimmed cuts removed from a carcass, the operator of the plant can establish the actual yield of a carcass, i.e. the total saleable weight of all cuts removed from that carcass as compared to the original weight of the carcass. From this the operator is able to determine whether his workers are working efficiently. Furthermore, because it is also possible to establish a history of the weights of cuts of a particular type as a proportion of the weights of the carcasses from which they were removed, the operator can also determine whether a particular worker (i.e. the worker who is responsible for removing the particular cuts in question) is working efficiently.

Additionally, provided the source of each carcass is known, the operator can also determine which farmer is supplying the animals with the best yield. Moreover the farmers will be able to use the information to improve the quality of their stock, for example by better breeding and feeding.

Various aspects and embodiments of the invention are further described with reference to the accompanying drawings in which:

FIGS. 1–3 a side view, plan view and end view respectively of a loading fork for loading cuts of meat into packages at a packaging station in a meat packing plant;

FIG. 14 is a cross sectional view of a feeding magazine for feeding cuts of meat to the conveyor shown in FIG. 7;

FIG. 19 is a schematic side view of part of a modified conveyor;

FIG. 20 is a schematic plan view of the conveyor shown in FIG. 19;

DETAILED DESCRIPTION OF EMBODIMENTS OF THE INVENTION SHOWN IN THE DRAWINGS

Figure 1:
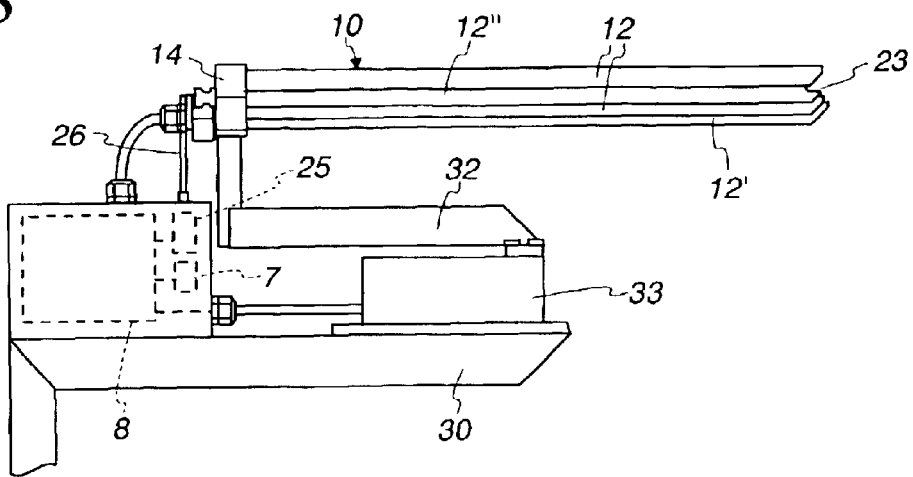
Figure 2:
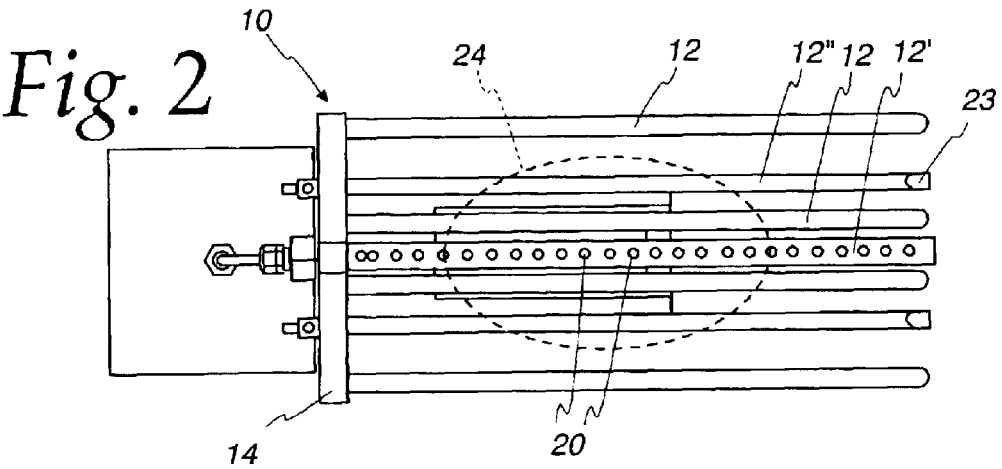
Figure 3:
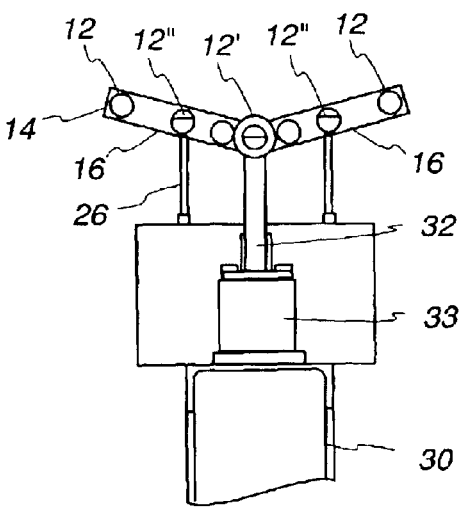
Figure 4:
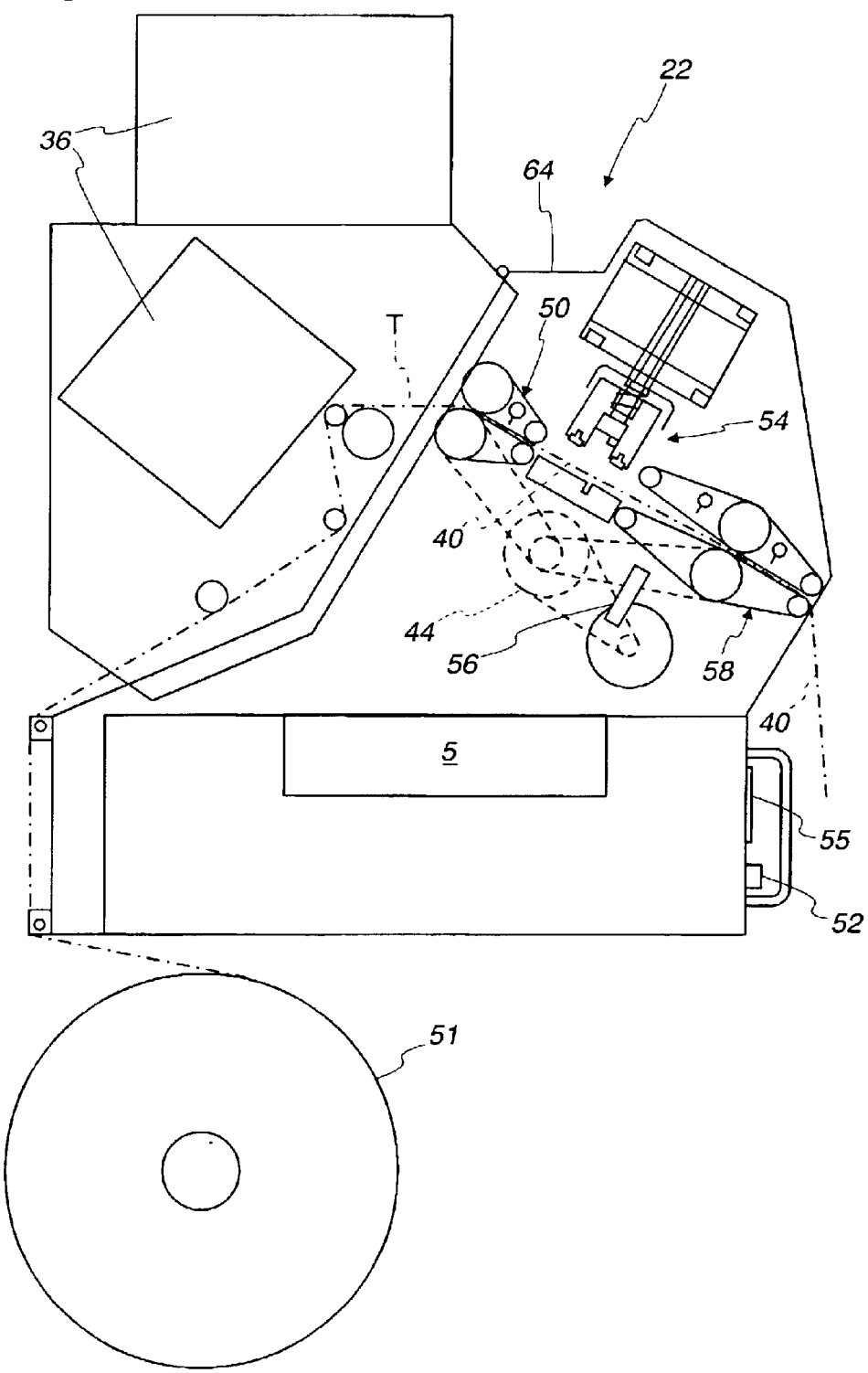
FIG. 4 is a schematic sectional side view of a bag producing machine suspended over the loading fork.

In FIGS. 1–3 there is shown a loading fork 10 which comprises seven bars 12, 12', 12" of polished stainless steel tubing projecting horizontally from a cross piece 14 located at one end of the fork. The cross piece comprises two portions 16 sloping upwardly and outwardly from a low central position at which the single bar 12' is located. Each portion 16 carries three of the bars 12, 12". The bars collectively constitute a trough which diminishes the likelihood that a cut of meat placed on the fork will slip off.

Figure 5:
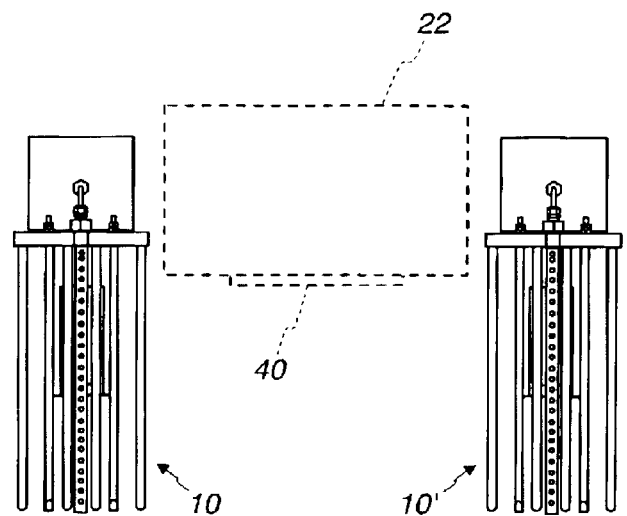
FIG. 5 is a schematic plan view of two of the loading forks mounted in tandem below a single bag producing machine.

The centre bar 12' carries along its length an array of proximity sensors 20 in the form of light sensitive diodes. The sensors 20 are set into the upper surface of the bar, facing upwardly. The sensors are interconnected by conductors carried in the bore of the bar 12' to an electronic controller 8 in the form of a PLC which integrates the operation of the fork 10 with that of one or more bag producing machines 22 located over the fork 10 as indicated in FIG. 5. The bag producing machines 22 are discussed below.

When a cut of meat 24, or other object, is placed on a fork, it will overlie a series of the sensors 20, thereby changing the level of ambient light sensed by those sensors. The remaining sensors in the array which are not covered by the cut will register no change in the light. The number of sensors which register the change in light will depend on the length of the cut 24 where it crosses the bar 12'. The controller 8 is arranged to count the number of sensors in the series which register the change and to convert the count to a signal which varies in proportion to the distance between the two sensors at the ends of the series. This signal thus provides an approximation of the length of the cut 24. It is sufficient for present purposes that the sensors are spaced 25 mm apart.

It is immaterial where the cut 24 is placed on the bar 12' as long as lengthwise it is disposed substantially parallel to, and overlying, the bar 12'. Although the cut overlies a different series of the sensors 20, it will still overlie the same number of sensors and its length will be determined by the controller 8 in the same way as described above.

A bracket 30 located below the fork 10 is fixed to the centre of the cross piece 14 and connects the fork to a standard, commercially available load cell 33. The load cell is mounted on a stand 32 and the entire fork 10 is thus supported in its working position, through the load cell, by the stand. The load cell is connected to a converter 9 which is in turn connected to the controller 8. The analogue signal generated by the load cell in response to the placement of a cut of meat on the fork is amplified by the converter 9 and converted to a digital signal which is transmitted to the controller B. The controller 8 controls a commercially available printing device 36 located in the machine 22 as described in further detail below.

In response to the weight and cut-length signals the controller 8 is set to cause the machine 22 to produce a bag of length matched to the length of the cut which is to be placed therein and at the same time to activate the printing device to print the weight of the cut either directly on the bag as it is being produced by the machine 22 or on a self adhesive label which is applied to the bag automatically as the bag is being produced.

The free ends 23 of the two bars 12" located adjacent the centre bar 12' are open. Passages are provided within the cross piece 14 which connect the bars 12" to a source of compressed air via a solenoid operated valve mounted at the back of the cross piece 14. The valve and the solenoid are indicated at 25. Compressed air is carried to the valve by an air inlet pipe 26. The solenoid is also connected to the controller 8. In response to signal received by the controller 8 from the load cell 33 when the latter senses that a cut has been placed on the fork 10, the controller causes the solenoid to open the valve to allow compressed air to pass to the bars 12". This air issues as a blast from the free ends of the bars 12" and materially helps both to open a bag when the bag is being placed over the fork and also to keep the bag expanded once it is in place. This feature is especially useful when cuts of hot beef are being bagged.

The machine 22 produces bags which can be individually varied in length so that they can be used for packaging the cuts of meat or other articles which, within limits, vary unpredictably in length. The machine is commercially available and examples of the machine are also described in detail in the aforementioned application #PCT/NZ94/00024. The machine will thus be only briefly described here. The machine comprises a drive roll and belt assembly 50 for feeding the front portion of a flat tube T of plastics packaging material from a roll 51 through a cut off and heat sealing device 54. A light activated proximity sensor 56 is mounted adjacent the device 54 and through electronic circuitry causes the assembly 50 to be immobilised when a said front portion of the tube T, whose length is variable and is determined as described below, has advanced through the device 54 and also through a feed roll and belt assembly 58. This front portion is cut off by the device 54 and sealed along the cut edge to form a bag 40. The printing device 36 is conveniently mounted on the cabinet 42 of the machine. The printing device prints the weight of a cut, received as described above, and advantageously other information as discussed below, on the bag as it is being produced. The bag 40 is retained by the machine 22 with a lower part 40' of the bag hanging down outside the cabinet 42. The bag is so retained, unopened, by virtue of being lightly gripped by the belts of the assembly 58. The machine remains immobilised as long as the presence of the bag is sensed by the proximity sensor 56.

The machine 22 is provided with a keypad 55 connected to a controller 5 which is set cause the printing device 36 to print the type and/or the grade of a cut, entered on the keypad by the operator, to be printed on the bag. The controller 5 can also be set to enable the operator, through the keypad, to select the length of a bag.

The controller 5 can also be set to cause the printer to print on the bag the weight of the cut received from the controller 8 as mentioned above and further information which could include the time and the plant at which the cut was bagged, and the source of the cut determined in the manner described below. Such information is nowadays becoming increasingly important for quality control and regulatory purposes. Clearly the term "time" as used herein could mean not only the hour of the day but any other information (such as the shift or the date) which serves as an indication of the time when the cut was bagged. If the cut is later found to be contaminated or otherwise faulty, any of this information could be useful in identifying other cuts which may be similarly faulty and, inter alia, limiting the amount of product which may have to be recalled on that account.

The produced bag is removed from the assembly 58 by the operator who tugs the part 40'. After the bag is removed, a switch connected to the controller 5 must be activated to cause the machine 22 to produce another bag. This switch may be a manual switch (indicated schematically at 52) activated by a human operator or may be an electronically controlled switch activated by a signal generated by the proximity sensor 56 when an already produced bag is removed from the assembly 58 and is no longer sensed by the proximity sensor.

After the sensors 20 in the bar 12' have detected that a cut of meat has been placed on the fork 10 and determined its length, the length is stored in the controller 5 until the production of a bag for that cut is triggered as described above. In the present case the controller 5 causes the electronic controls of the machine 22 to vary the number of revolutions of a stepping electric motor 44 which drives the drive rolls 50 in proportion to the bag length required.

In the arrangement shown in FIG. 5, a single bag producing machine 22 is suspended above two mutually identical loading forks 10, 10'. The advantage of mounting two forks in tandem will be apparent from the following description of the operation of the arrangement. In the description, it is assumed that a cut of meat ("cut #1") is in place on the first fork 10 and that the machine 22 has already produced a bag ("bag #1") for packaging cut #1. It is also assumed that bag #1 is still retained in the machine 22. From this stage, the operation of the apparatus is as follows:

Before attending to the bagging of cut #1, the operator places a further cut ("cut #2") on fork 10'. Only after doing so does the operator remove bag #1 from machine 22 and attend to the bagging of cut #1. He does this by removing bag #1 from the machine 22, opening the bag and drawing it over the fork 10 with cut #1 supported thereon the bagged cut #1 is then slid off the fork 10. While this is being done, the machine 22 produces the bag ("bag #2") for cut #2 the length data for which has already been provided by fork 10' and is stored in the controller 5. When the bagging of cut #1 is completed, bag #2 has already been produced. As before, the operator places the next cut of meat (cut #3) on fork 10 before attending to the bagging of cut #2. And so on.

While the machine 22 is producing a bag for one cut of meat the operator can thus be occupied in bagging another cut of meat.

Figure 6:
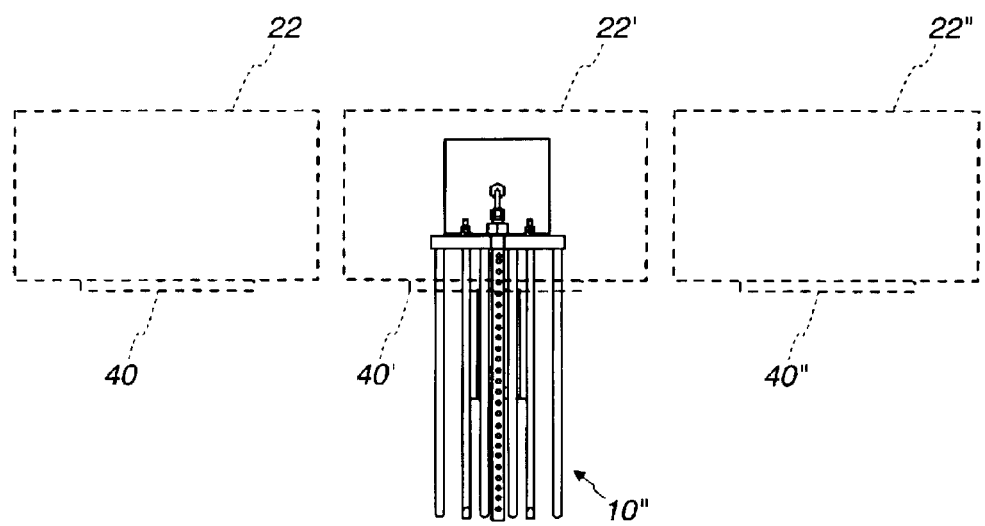
FIG. 6 is a schematic plan view of a modified loading fork mounted below three of the bag producing machines.

In the arrangement shown in FIG. 6, there is a single fork 10" which is similar to the fork 10 except as discussed hereunder. A number of mutually identical bag producing machines (three of such machines 22, 22', 22" being shown in FIG. 6) are suspended above the fork 10". Each of the machines 22, 22', 22" is loaded with flat tube T of plastics film of a different width. The bars 12, 12', 12" are insulated from the cross piece 14. Each of the outer bars 12, 12" is connected through a current detecting device 7 to one pole, and the inner bar 12' to the opposite pole, of a low voltage source of electricity. The current detecting devices 7 are connected to the controller 8. When a cut of meat is placed centrally on the fork 10", it will lie in electrical contact with the inner bar 12' and one or more of the outer bars 12, 12" depending on the width of the cut. Current will flow in these bars to the centre bar 12'. The controllers is programmed to count the number of devices 7 in which current flows (for example by measuring the total current flow) and to convert the count into an amplified signal which is transmitted to the controller 5 at the machines 22. A visual display displays this signal to the operator assigned to bagging the cuts as the width of the cut. The operator can then select the appropriate machine 22, 22' or 22" to produce a bag of suitable width most closely corresponding to that of the cut or the controller 5 can be set up to do so automatically.

In a further aspect, the invention provides a system of keeping track of the cuts of meat which are derived from carcasses in a meat packing plant so that the source of each trimmed cut can be established. The system advantageously has the ability to store information such as the identity, weight and/or the other characteristics mentioned above of each cut.

For convenience, the carcass from which a cut of meat is derived will be referred to herein as the "source carcass". Similarly, the live animal from which a carcass and the cuts taken therefrom are derived will be referred to herein as the "source animal". References to "identifying" or "the identity of" a cut or a carcass imply the ability to know the identity of the source animal from which the cut or carcass was derived.

The system comprises apparatus and a data management system for keeping track of the various parts of a meat-producing animal such as a steer which is dismembered in a meat packing plant, so that the useful yield of an individual animal can be established. This enables the various cuts from a source animal to be labelled accurately and tracked to the point of retail sale. It also enables wastage to be identified early and provides a basis for the plant operator to select preferred kinds of source animals in the future. Moreover, the system enables the actual yield of each carcass (i.e. the sum of the weights of cuts taken from that carcass) to be compared to the "theoretical" yield which is the yield expected by the operator from animals of a certain grade and on which the price that he paid for those animals was calculated.

Figure 7:
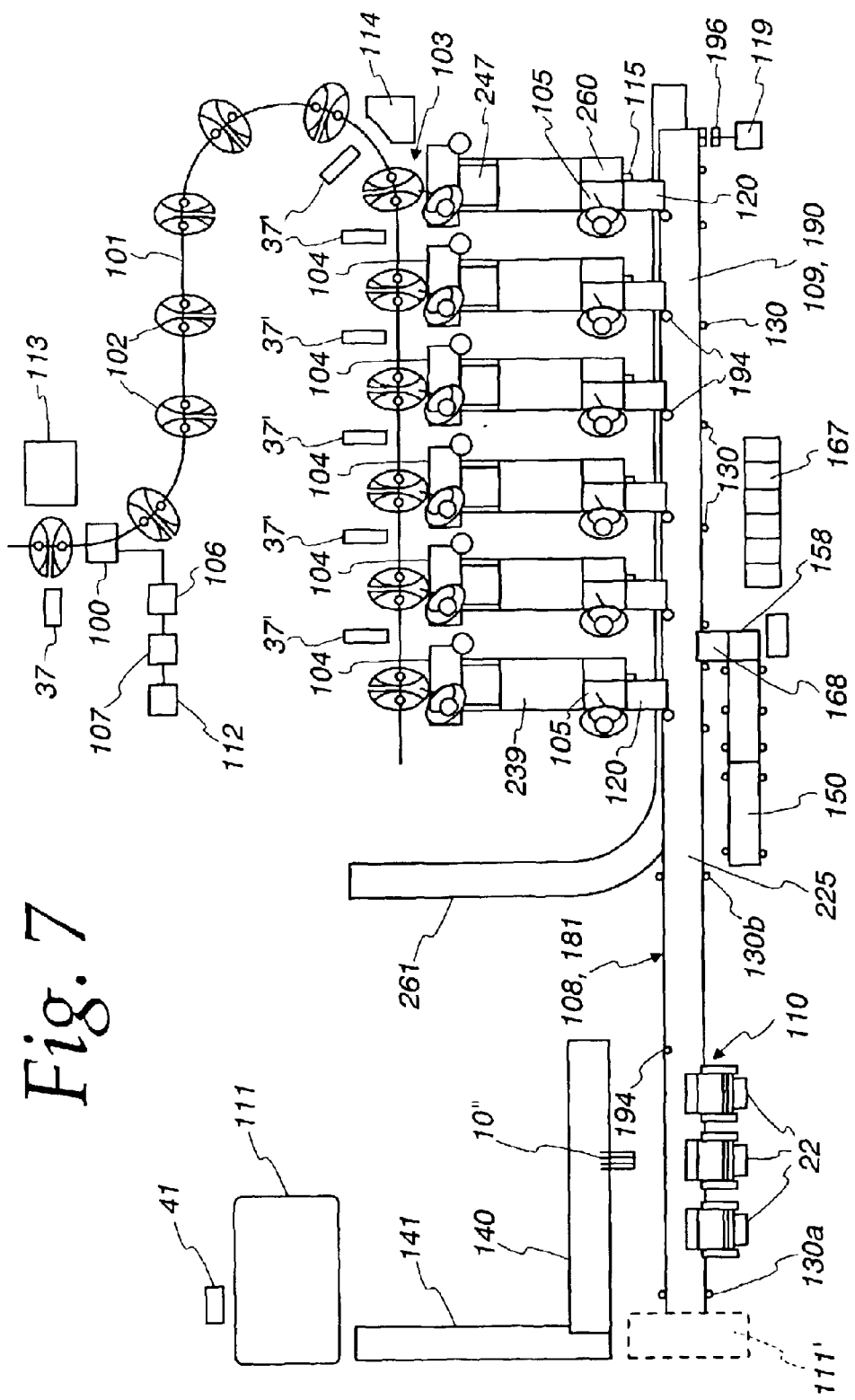
FIG. 7 is a diagram of a first layout of part of a meat processing and bagging plant.

Referring to FIG. 7, after animals are slaughtered, the carcasses 102 are brought to a locality 113 where each carcass is weighed on a conventional carcass weighing scale 100 and hung by its hind legs from a device called a chain or boning line 101. This is in reality a powered rail or conveyor in which an actual overhead chain pulls a series of carcass supporting hooks along an endless track at a slow and controlled speed. The construction and operation of boning lines is well known and will not be described in detail here except where the boning line 101 shown may differ from conventional boning lines.

The carcass weighing scale comprises a commercially available load cell 106 connected through an electronic controller 107 and an analogue/digital signal converter 112 to a central processor 34 as further discussed below.

The carcasses are carried by the boning line past a boning section 103 comprising a series of boning stations 104. In the present case six such stations are illustrated. At the boning stations cuts are removed from the carcasses. In most meat works it is standard practice that only cuts of a predetermined type (sometimes even a single such cut) are removed from each carcass at a particular boning station. For example, forequarters (even a single forequarter) may be removed at the first boning station, tenderloins may be removed at the second station, and so on until, after the sixth boning station, only part of the skeleton remains which is sent off for rendering. At each boning station, removal of the cut from a carcass is carried out by a first operator who feeds the cuts to a second operator for trimming. The cuts are removed from the carcasses in the order in which the carcasses arrive at each boning station.

After the cuts are so removed at the boning stations, the cuts are (in the present case) weighed before being passed to trimming tables where they are trimmed of bone, fat and the like. In the present case, there are six trimming tables 105, one associated with each boning station; i.e. at each trimming table, in normal operation, only the cuts received from its associated boning station are trimmed.

After a cut has been trimmed, the trimmer places the cut on a conveyor 108. The conveyor 108 passes the output side of the trimming tables and carries cuts placed thereon at the trimming tables to a bagging station 110. At the bagging station the trimmed cuts are weighed and bagged, in the present case by apparatus as described above with reference to FIGS. 1 to 4 and FIG. 6. From the bagging station the bagged cuts are taken to a vacuum packing station 111.

In practice, the times taken for the cuts to be trimmed vary significantly. Because of this the trimmed cuts are placed on the conveyor 108 in an unpredictable order. In some conventional meat packing plants, before the cuts are bagged, the operator at the bagging station divides the cuts which arrive at the bagging station into groups according to their type. In this procedure the cuts from several carcasses are mixed. The cuts in a group are then bagged in sequence. In both of these cases it is not possible to identify individual cuts with their source carcasses when the cuts are bagged. The present invention addresses this issue by the provision of means for keeping track of each carcass and thereafter of each cut after it is removed from that carcass to the stage that the cut is bagged. By this means it is possible to obtain accurate, and particularly quantified, information to enable the operator of the meat plant to determine which farmer supplies the animals with the best yield.

If this goal is to be realised it is necessary to provide a monitoring system which ensures that (a) the identity of an individual live animal is correlated at the time of slaughter with the carcass of that animal; (b) each carcass is tracked so that its identity is known when it is fed to the boning stations; and (c) each cut is tracked so that its source carcass is known when the cut is weighed and bagged.

Although some or all of the steps of the monitoring system might in certain limited circumstances be carried out by human operators using visual observations, the monitoring system will in most practical situations have to be automated and computerised in order to be commercially viable or useful in a practical sense,; i.e. the various tracking steps will in most cases have to be carried out automatically and the necessary data entered in an electronic processor programmed to store the data and to manipulate it to produce the required results.

Figure 23:
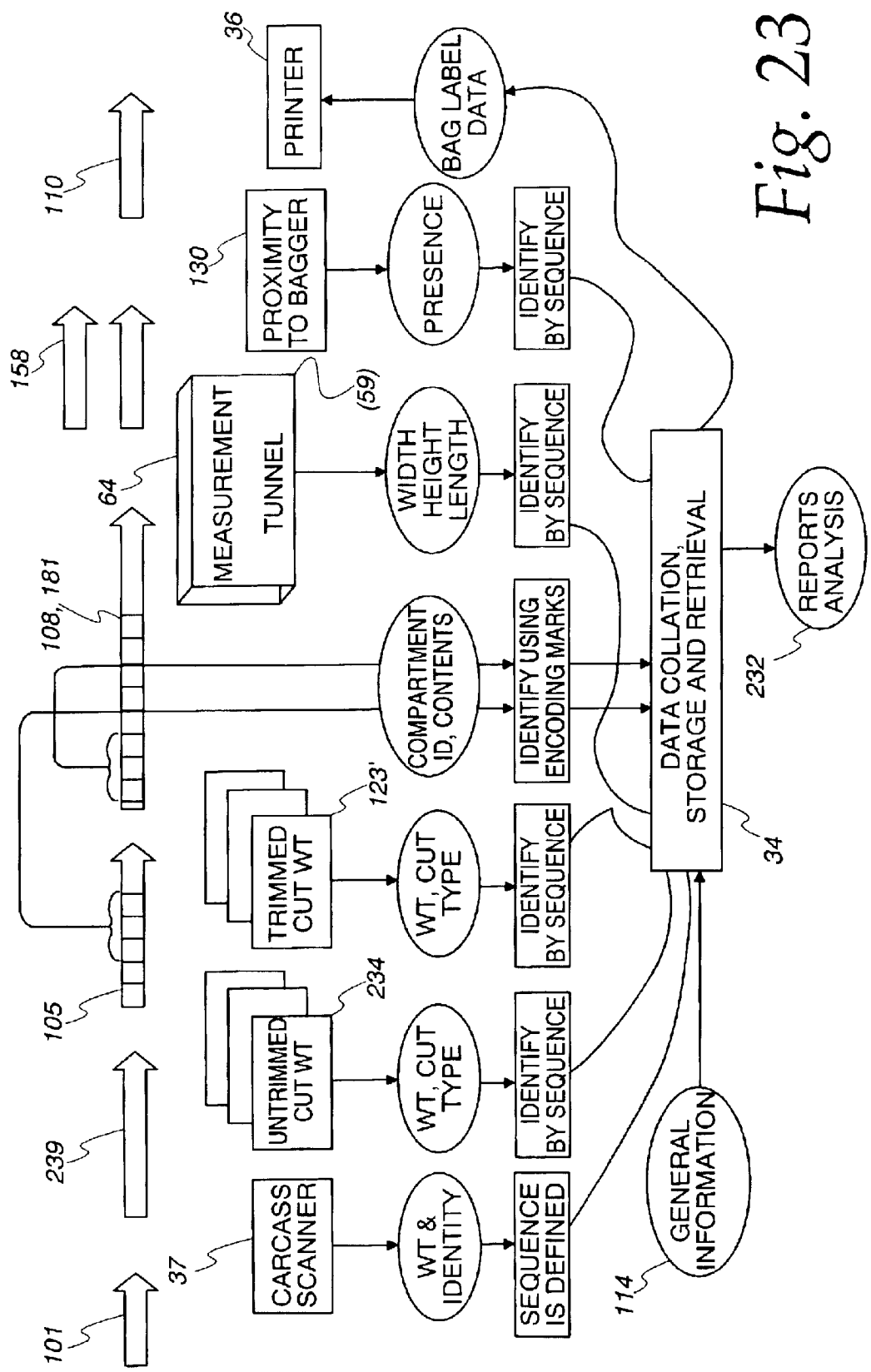
FIG. 23 is a diagram illustrating the flow of information across the apparatus shown in FIG. 15.

For this purpose a central programmable electronic processor (i.e. a computer) is provided and is indicated schematically by the box 34 in FIG. 23. Data from the various stations at which operations are carried out on the carcasses and the cuts, from the time that they are removed from the carcasses to the time that they are bagged, is transmitted to the processor. For example, the weight data for the carcasses and the cuts is fed to the processor 34, the former by the weighing device 100 and the latter by means described below.

Figure 9:
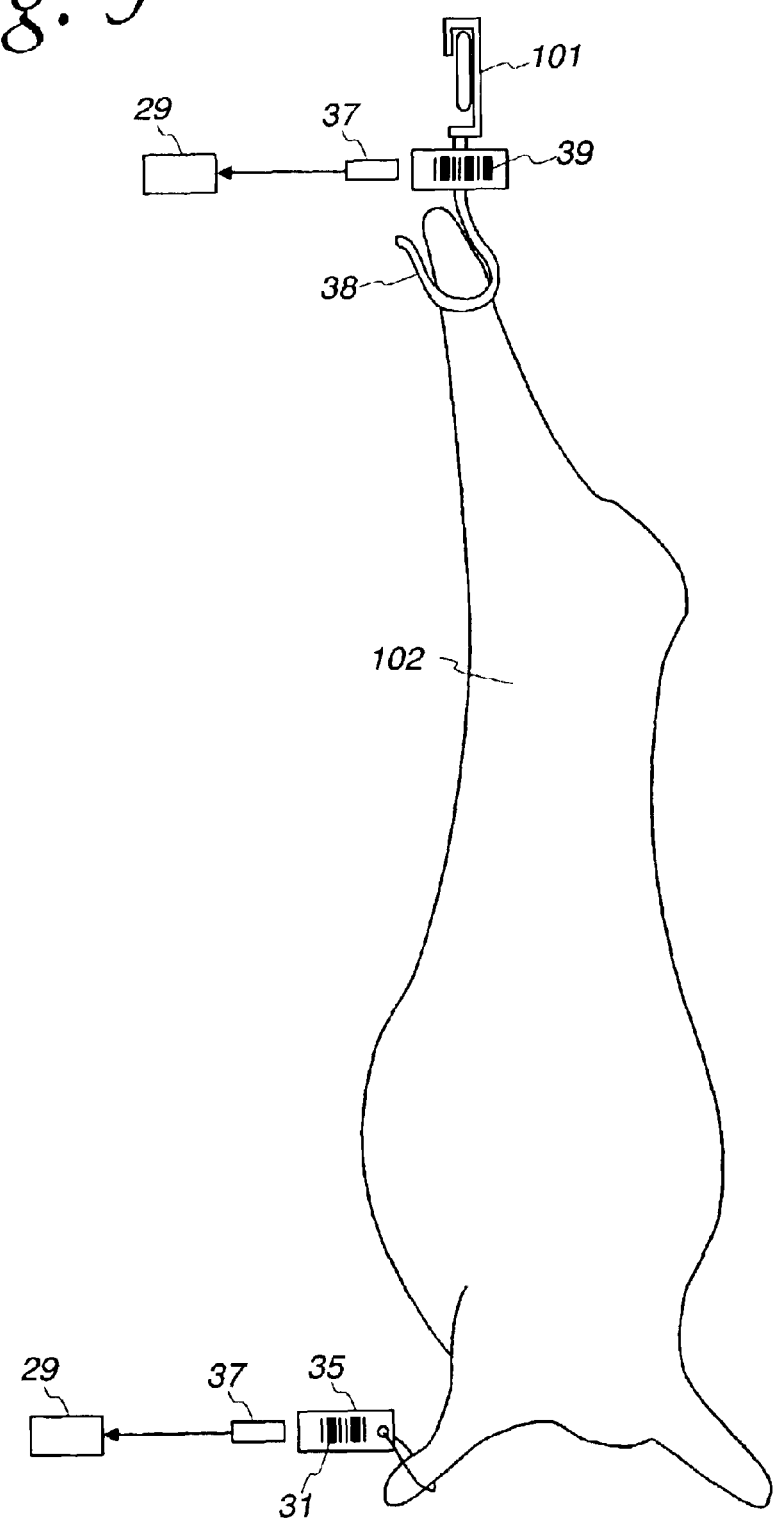
FIG. 9 is a detail of a carcass loading hook carrying a bar coded identification tag.

In most meat packing plants it is common for live animals, all from a single farm and all of the same breed, to be processed in groups called "mobs". Because of this, it would often be reasonably easy to identify the supplier of any carcass arriving at the boning stations. However, if the plant operator requires certainty in this respect, an identification tag may be applied to each animal when it is slaughtered. This tag might simply be marked with such information as a carcass number, its deadweight, the name of the supplier of the animal and its breed; or an alphanumeric number in which the same information is encoded. This information will be entered in the processor 34 and indeed the tag might be produced by a printer controlled by the processor 34. Alternatively, as shown in FIG. 9, the tag, 35 might be marked with a bar code 31. In the latter case the bar code 31 is scanned, for example by a hand held scanner 37 as the tag 35 is attached to the animal, and transmitted via a controller 29 to the processor 34 which is programmed to correlate the bar code with the identity of the source animal. The tag 35 is transferred to the carcass (or left in place on the carcass) after the animal is slaughtered and remains on the carcass at least until the carcass is mounted on the boning line.

Unless the tags are left on the carcasses when they are placed on the boning line, the monitoring system must also incorporate some means to correlate each carcass with the hook on the boning line which carries such carcass. To this end each hook 38 of the boning line may be provided with its own permanent bar code 39 which is scanned by a scanner 37 at the locality 113 where a carcass 102 is mounted on such hook. Again, the scanner 37 transmits the scanned information through a controller 29 to the processor 34. If the information on the tag 35 attached to the carcass is not machine readable, this information will have to be entered into the processor 34 manually and correlated in the processor against the permanent bar code 39 on the hook. Where there is a bar code 31 on the tag 35, this is scanned at the same time as the bar code on the hook and the two bar codes are correlated in the processor.

Instead of providing the hook with a permanent bar code 39, the bar coded tag 35 can be removed from the carcass and attached to the hook 38 on which the carcass is mounted.

By this means, through the processor 34, the identity of a carcass on any hook is established.

The identity of each carcass 102 arriving at the boning section 103 can be established by scanning the bar codes 39 on the hooks with scanners 37' located adjacent each boning station 104. Through the processor, this correlates each carcass which passes a boning station with the source of the carcass. The scanners 37' are identical to the scanner 37 and communicate with the processor 34 via a controller 29'.

Alternatively, if a bar code system is not used, the processor can be programmed to establish the identity of each carcass which passes a boning station by calculation and monitoring the travel of the boning line. This may be achieved, for example, by providing that the distance between the loading station and the boning stations is stored in the processor and the speed of the boning line and the times and sequence of loading the carcasses on the hooks are monitored by the processor.

If the tags or hooks are not bar coded, it may be more convenient to enter the identity of the carcasses into the processor at the locality 114 before the carcasses proceed past the boning stations. One reason for this is that some carcasses may be condemned and removed before they arrive at the boning stations.

Turning now to the monitoring of the cuts, it is convenient first to discuss the cuts after they leave the trimming tables 105. In many cases the conveyor 108 may be an existing conveyor or a conveyor of substantially conventional construction. In such a case the processor can be programmed to establish the identity of each cut by monitoring the travel of the belt 109 of the conveyor 108. This may be achieved, for example, by providing that the distances between each trimming table and the bagging station are stored in the processor and the speed of the belt 109 and the time of placing each cut on the belt at each trimming table are monitored.

The speed of the belt 109 may, for example, be monitored by measuring the rotational speed of one of the end rollers. This may be achieved by the use of a commercially available capacitive sensor 196 actuated by trigger blocks mounted on the conventional end roller/drive motor assembly 131 which drive the belt. The sensor is positioned so that, when the trigger blocks pass the sensor as the roller rotates, the sensor senses the proximity of the trigger blocks and generates signals which are transmitted to a controller 119 connected to the processor 34. The controller is set to control the drive motor. The frequency of the signals, which is dependent on the rotational speed of the end roller, is measured by the controller. This, together with the diameter of the roller, which is known, is used by the processor to calculate the peripheral speed of the roller and hence the speed of travel of the conveyor.

Since the speed of the conveyor 108 and the time and location of the placement of a cut thereon is monitored by the processor, the processor is able, by suitable programming, to calculate the time of arrival of that cut at the bagging station. From this the processor is able to establish the identity of each cut which arrives on the conveyor 108 at the bagging station, provided that such identity was already established when the cut was placed on the conveyor.

The belt 109 may be of substantially conventional construction. For example, such belts of a plastics material suitable for conveying meat products are manufactured in Israel and sold under the trade mark VOLTA. However, it is considered preferable to provide a system for positively identifying each position on the belt at which a cut is placed at the trimming tables and also at the bagging station. For this purpose a conveyor 181 provided with a belt 190 shown in FIGS. 19–20 may be used instead of the conventional belt 109. The belt 190 is driven by a conventional end pulley/drive motor assembly 189. The belt 190 has an upstanding flange 191 welded along the length of one edge thereof. Furthermore, ribs 192 evenly spaced apart along the entire length of the belt are welded across its upper face. The flange and the ribs can easily be welded to a belt made of the aforementioned VOLTA material. In the present example the ribs are 80 cm apart and define cells in the belt in which the cut or cuts which are removed from a carcass and trimmed at the trimming tables are placed.

Arrays of stainless steel discs 193 are mounted in the flange 191, one array adjacent each of the ribs 192. In each array there are one or more spaces of uniform size between some pairs of adjacent discs. In the present example, there are up to eight discs in each array. The spatial arrangement of the discs and the spaces therebetween in each array is different so that the arrangement adjacent each rib is unique to that rib.

An array of capacitive sensors 194 is mounted on the frame (not shown) supporting the belt 190. Such sensors are commercially available. The sensors are connected via a controller 195 to the processor 34. The sensors are positioned in a row extending in the direction of travel of the belt. As an array of discs (say the array 193') is carried past the sensors by the belt, it causes the sensors to transmit a signal to the controller the nature of which is unique to the array 193'. The controller forwards the signal to the processor 34 which is programmed to record the time at which the signal is received and to identify, from the signal, the cell at which the array 193' is located. The processor is also programmed to monitor the time interval between the signals. By integrating each such time interval with the known distance between the arrays, the processor can determine the speed of travel of the belt 190. From this information the processor is programmed to calculate the position of any cell at any given time. The processor is also programmed to integrate this information with the signals from the conveyor assemblies 120 discussed below indicating that cuts have been placed on the belts 122 thereof and thereby to cause those assemblies to feed the cuts to empty passing cells on the belt 190.

Thus the processor can establish the time of arrival of any cell (and hence of a cut placed thereon) at the bagging station 110. Provided the identity of each cut is known when it is placed on the cell, the processor is able to cause the bagging machines to produce bags which are imprinted with the data (as discussed above) concerning the cuts which are subsequently placed therein.

Because the sensing arrangement enables each cell and its position at any time to be identified, it is not strictly necessary to provide more than one array of sensors 194. However, it may be useful to provide more of such arrays for verification purposes. Such arrays are located at intervals along the length of the belt 190. In particular it may be useful to provide an array of the sensors adjacent each trimming table and one at the bagging station 110. In the latter case the identity of each cell (and thus of the cut thereon) which arrives at the bagging station is determined without reference to the speed of the belt 190.

The invention is not limited to the use of capacitive sensors 194. For example, light sensitive sensors arranged to read bar codes applied to the belt 190 instead of discs 193 may also be used.

A simple method of establishing the time of placement of the cuts on the conveyor 108/181 from the trimming tables is to provide a manually actuated push button 115 at each triming table. The push button 115 is connected to the processor 34. When the push button is pushed a signal is sent to the processor 34 which records the time at which signal was received from the push button in question. Each trimmer must be trained to actuate the push button at his trimming table when he places a cut on the conveyor.

However it is considered preferable to provide means for automatically determining when a cut is placed on the conveyor 108/181 at each trimming table instead of, or in addition to, the push button 115. One example of such means is shown in FIG. 14 and comprises a short conveyor belt assembly 120 located between the trimming table and the conveyor 108/181. The entire assembly 120, including the belt 122, end pulleys, a motor which drives one of them, and a bracket 125 which carries them, is mounted on a load cell 123. The motor and the end pulley to which it is connected are indicated at 121. The load cell is connected through a converter 235 to a controller 234 which also controls a feeding device (also illustrated in FIG. 14) which is further discussed below. The controllers 234 of all six assemblies 120 are connected to the processor 34. When the operator places a trimmed cut on one of the belts 122 (the belt 122', say) the presence of the cut is sensed by the associated load cell 123' which transmits a signal through the associated controller 234' to the processor 34. The signals from all of the controllers 234 are transmitted to the processor 34. The processor 34 is programmed to integrate the timing of such signals with the speed of the conveyor 108/181, and with the timing of similar signals received from a controller 164 when retrimmed cuts are transferred to the conveyor 108/181 from the retrim conveyor 150 as described below. The processor thereby determines when there is an empty space on the conveyor 108/181 which can accomodate the cut on the belt 121'. As soon as the processor has determined that such a space exits, it transmits a signal to the controller 234' which causes the controller 234' to activate the drive to the belt 121' and feed the cut onto the conveyor 108/181. The processor also registers the time at which the belt activation signal was sent to the controller 234'.

It is convenient to note here that means, which in the present case are in the form of commercially available optical sensors 130 of the "through beam" type, are mounted at intervals alongside the conveyor 108/181 for sensing each cut as it is carried towards the bagging station 110. The sensors 130 are connected to a controller which, in the case of the conveyor 181, is the controller 195 and in the case of the conveyor 108, is the controller 119. Each sensor 130, upon sensing the passage of a cut, transmits a signal to the processor 34 via the controller 119, 195. The processor is programmed to integrate the timing of such signals with the speed of the conveyor 108/181 and also, in the case of the conveyor 181, with the signals received from the sensors 194. The processor is thereby able to verify the presence and identity of each cut and, as discussed above, to establish that there is an empty space or cell on the conveyor 108/181 which can receive a cut from one of the assemblies 120.

The controllers 234 may be set to transmit the weight of each trimmed cut (as measured by the load cells 123) to the processor. This weight may be compared to the weight of the cut when it is bagged for the purposes of verifying the identity of the cut. Clearly, if the weights do not correspond, a fault has occurred.

In order to establish the identity of each cut which is placed on the conveyor 108/181, feeding devices are provided by which cuts are fed to the trimming tables in the order in which they are removed from carcasses at the respective boning stations. One such feeding device is provided for each boning station/trimming table pair.

For such a feeding device to be effective, it is necessary for the operator at each boning station to feed the cuts to the feeding device in the order in which the cuts are removed from carcasses. It is also necessary for the trimmer (or "slicer") to trim the cuts in the order in which they are fed to him by the feeding device and to place the trimmed cuts on the conveyor 108/181 in the same order. Provided that this order is maintained the processor 34, by suitable programming, can correlate the order in which carcasses are placed on the boning line with the order in which trimmed cuts are placed on the conveyor 108/181. By this means the source carcass of each cut is established and stored in the processor when the cut is placed on the conveyor.

A suitable such feeding device is shown in FIG. 14. The device comprises in essence a magazine 239 comprising a series of conveyor belt assemblies 240, 241, 242, 243 mounted in a cabinet 280 located between each boning station and its associated trimming station Each assembly 240–243 comprises a belt (respectively indicated by the numerals 240'–243') and a conventional end pulley/drive motor assembly (respectively indicated schematically by the numerals 240"–243"). Through suitable electronic control circuitry, the motors are connected to the controller 234. The controller 234 of each magazine 239 is connected to the processor 34. The assemblies 240–243 are essentially enclosed by the cabinet. The cabinet has walls including a top wall 245 and an end wall 246. At the end of the top wall 245 adjacent the boning station there is an opening 247. There is a second opening 248 in the end wall 246 adjacent the trimming table. Each opening is marginally bigger than the size of any cut which the magazine will handle so that only one cut at a time can pass through either opening.

Figure 11:
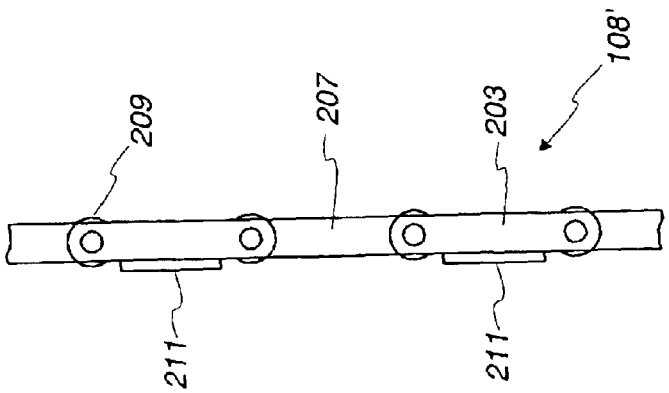
FIG. 11 is a detail of part of the fork conveyor viewed in cross section on Arrows A—A in FIG. 10.
Figure 10:
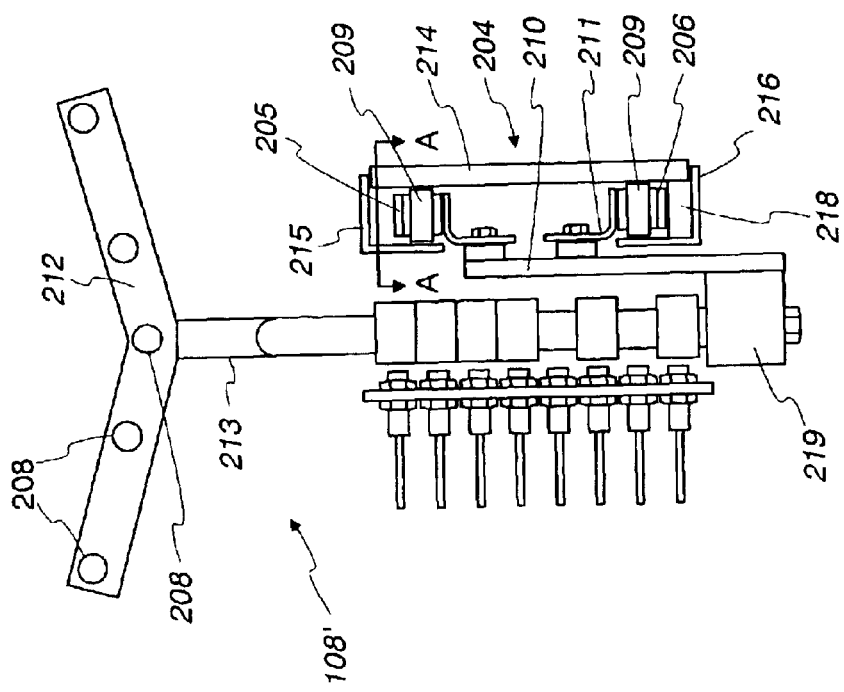
FIG. 10 is a cross sectional view of part of a fork conveyor.

The complete uppermost assembly 240, including the belt 240' and the end pulleys and drive arrangement 240" is supported on a pair of load cells 124, 124a. The load cells are connected through a converter 125 to the associated controller 234. One end of the belt 240' of the assembly 240 is located directly below the opening 247 so that an untrimmed cut of meat removed from a carcass by the operator at the boning station and dropped through the opening 247 will be deposited on the belt 240'. Two commercially available light activated sensors 249, 250 of the "through beam" type are mounted on a side wall of the cabinet, just above the level of the belt 240'. The first sensor 249 is positioned directly below the opening 247 near one end of belt 240' and the second sensor is positioned near the opposite end of belt 240'. Both of the sensors are connected through the controller 234 which controls the movement of conveyor 240 as follows:

When sensor 249 senses the presence of a cut it transmits a signal to controller 234 which activates load cells 124, 124a to weigh the cut. After a time interval which is determined by controller 234 and which is sufficient for the weight of the cut to be determined and stored in the processor 34, controller 234 activates conveyors 240, 241. Conveyor 241 carries each of the cuts sequentially to the right in FIG. 14 and drops the cuts through a space 258 between the right hand end of conveyor 240 and the end wall 247 onto the right hand end of conveyor 241. Conveyor 241 carries the cuts to the left in FIG. 11 and drops them through a space 259 onto the left hand end of the third conveyor 242. The fourth conveyor 243, which is only long enough to carry two cuts, is level with the third belt and also with the trimming table 105. The cuts are fed sequentially by the third and fourth belts through opening 248 onto the trimming table. Five equally spaced light activated sensors 253–257 which are also of the "through beam" type are mounted in the side wall of the cabinet, just above the level of conveyors 242, 243. The first three sensors 253, 254, 255 are positioned over the left hand end, centre and right hand end respectively of conveyor 242. The fourth sensor 256 is positioned over the centre of conveyor 243 and the fifth sensor 257 is positioned as close as possible to opening 248. The sensors 253–257 are connected through controller 234 to the processor 34 and the motors which drive the conveyors. By this means the sensors control the movement of conveyors 243, 244 as follows:

A cut which is fed by conveyor 243 through opening 248 will come to rest (as a result of friction with the trimming table) before it has passed sensor 257. Such a cut will have to be removed manually by the trimmner. This arrangement is intentional and helps ensure that the trimmer trims the cuts in the proper sequence. As long as sensor 257 senses the presence of a cut at opening 248, conveyor 243 is immobilised by sensor 257. Moreover, after the cut has been removed from the opening, a foot operated switch, shown schematically at 239a must be actuated by the trimmer in order to activate conveyor 243 to feed another cut to the opening 248.

When a cut (say cut #1) is sensed by sensor 255 at the right hand end of conveyor 242, as long as there is not already another cut on conveyor 243, sensor 255 will activate conveyor 243 to carry cut #1 towards the opening until it is sensed by sensor 256 at the centre of conveyor 243. At this stage sensor 256 will always cause conveyor 243 to stop until the foot operated switch 239a is actuated. As long as there is a cut at the centre of conveyor 243, conveyor 242 will be stopped when a cut thereon reaches the right hand end thereof and is sensed by sensor 255.

A cut (say cut #2) which drops off conveyor 241 onto the left hand end of conveyor 242 will be sensed by sensor 253. The sensor 253 will activate conveyor 242 to carry cut #2 to the right. Conveyor 242 will stop when sensor 254 senses cut #2. If there is no cut sensed by sensor 255 at the right hand end of conveyor 242, this conveyor will be activated again by another cut which drops onto it through opening 260, carrying cut #2 again to where it is sensed by sensor 255. If there is a cut at the right hand end of conveyor 242, conveyor 242 will then be activated only when that cut is carried off by activation of conveyor 243 through the foot operated switch 239a.

The magazine thus enables cuts of meat removed from a boning station to be queued in order, awaiting trimrning. If the operator at the boning station inserts the untrimmed cuts through the opening 247 in the order in which the cuts are removed from the carcasses, after passing through the magazine the cuts will be weighed and emerge from the opening 248 in the same order. This will help to ensure that the trimmer will trim the cuts in the same order.

It is necessary for the trimming operator to be trained to trim the cuts in the order in which he has uplifted the cuts from the device 239 and place the trimmed cuts in the same order on the conveyor assembly 120.

Because the identity of each carcass arriving at the boning section can be established, and because the cuts pass through the boning stations and corresponding trimming tables in the sequence in which the carcasses arrive at the boning section, the source or identity of each cut can be established. Also, because the processor has knowledge of the position of the conveyor 108/181 (in relation to the array of trimming tables) at the moment that a cut is loaded on the conveyor, the type of cut as well as its source can be established by the processor 34 without need for further cut recognition means.

The weights of the cuts, transmitted by the controller 234 are stored in the processor in the sequence in which the cuts are weighed. The signals from the controller 234 corresponding to such weights are integrated in the processor 34 so that the weight of each untrimmed cut is checked against the weight after the cut has been trimmed and is also later correlated against the weight of the source carcass.

For handling cuts of beef, the opening 247 is typically 60 cm long (across the cabinet) and 40 cm wide. The opening 248 is similarly 60 cm long and 30 cm high. The side wall of the cabinet adjacent which the trimmer works is advantageously of clear material to allow for inspection of the interior of the cabinet The front of each trimming table is provided with an opening 260. The trimmer is able to drop off-cuts from the trimmed cuts through this opening 260 onto a conveyor belt 261. The conveyor belt 261 carries the offcuts away for disposal in conventional manner.

Other types of feeding device, such as a screw conveyor or a simple inclined pipe through which the cuts pass by gravity, may alternatively be provided. Any feeding device should preferably be enclosed so that the trimmer is prevented from removing cuts from the feeding device out of sequence.

The processor 34 is programmed to feed the data relating to the type of each cut and its source carcass to the controller 5 at the bagging and printing section 110. This section is advantageously provided with a number of the bagging machines 22 and at least one loading fork 10" of the type described above. In FIG. 7, three such machines 22 are shown. Each machine 22 produces a bag of different width, say 250, 350 and 450 mm. The source and type of any cut removed from the conveyor 108/181 and placed on the fork 10" is established by the processor as described above. The controller 8 at the fork 10" activates the appropriate one of the machines 22 to produce a bag of optimum width and length suited to the cut. The controller 8 transmits the information relating to weight of the cut to the controller 5 which activates the printing mechanism 36 to print directly on the bag the weight of the cut. Also printed on the bag is the data already noted above relating to the type and grade of cut and its source animal. This data is transmitted to the controller 5 by the processor 34. In addition to carrying out the functions which have already been described, the controller 8 also transmits to the processor 34 data relevant to each cut including the weight and, optionally, the length and width of each cut and its bag.

The date and time at which the cut was bagged may also be transmitted by the controller to the processor 34 and/or printed on the bag. Any or all of the information appearing on the bag concerning the cut therein may appear in machine readable bar code (or other coded) form.

By this time, the processor 34 will be in possession of sufficient information to enable the weights of all of the trimmed cuts from one source carcass to be summed and compared with the theoretical weight and actual weight of the carcass and the estimated or "theoretical" weight of each trimmed cut as derived from the theoretical weight of the carcass. The yield, or the proportion of waste, of each carcass may thus be derived. The processor is also programmed to correlate the weight of each cut removed from a carcass at a boning station with the trimmed weight of the cut.

To ensure that cuts arrive at the bagging station in the order in which they were placed on the conveyor 108/181, the conveyor may run in a tunnel (not shown) which extends from the trimming tables to the bagging station.

In another alternative embodiment of the invention the conveyor 108/181 could feed the cuts to two forks 10, 10' or even more forks located in tandem below the machines 22, realising the same benefits as in the case of the embodiment described above with reference to FIG. 5. In this case the operator could judge the width of a cut placed on a fork by eye and manually activate the appropriate machine 22 to produce a bag.

After bagging, each bagged and labelled cut is forwarded to a vacuum packing station where the bags are sealed after the air is evacuated therefrom. In the embodiment shown in FIG. 7, after bagging the cuts are placed on a conveyor 140 which feeds the cuts to a second conveyor 141. The conveyor 141 in turn feeds the cuts to the vacuum packing station 111.

In an alternative embodiment, the bagged and labelled cuts are replaced on the conveyor 108/181 which feeds the cuts to the vacuum packing station indicated at 111'.

Since in either case the vacuum packing station 111, 111' is conventional, it will not be described here. However the bar code on each bag may be scanned by a scanner 41 before the cuts are cartonned so that all of the cuts in the carton are identified. The scanner 41 transmits the information via a controller 41' to the processor 34 which stores the information, together with the time at which it is received, for record keeping purposes.

It should be noted that, in many cases, multiple cuts of the same type from a single carcass may be trimmed and forwarded to the bagging station as a single unit and bagged in one bag. References to the processing of a single cut in this specification and the claims are intended to cover the processing of such multiple cuts.

It is possible that a cut loaded on the conveyor 108/181 may not get bagged at the bagging station. This can be detected in various ways. In the present case, one of the optical sensors 130 (say 130a) is located immediately downstream of the bagging station. When this sensor 130a detects a cut carried past the bagging station the sensor 130a transmits a signal to the processor 34. In the case where the bagged cuts are normally placed on the separate conveyor 140 for feeding to the vacuum packing station 111, the processor is programmed to treat any cut which is sensed by the sensor 130a as an unbagged cut. The bagging operator is trained to discard the bag which has been made for that cut. As mentioned above, the processor has already calculated the time at which each cut arrives at the bagging station and the sensor 130a, and also the identity of such cut.

It is also possible that a particular cut may be removed from the conveyor 108/181 at an inspection station 225 before it arrives at the bagging station. This is discussed in greater detail below. If this happens the absence of the cut will be detected by one of the optical sensors 130 (say 130b). The processor knows the time at which each cut should pass the inspection station, and also the identity of such cut. If a cut is not detected by the sensor 130b, no corresponding signal is transmitted to the processor by the controller 119. The processor registers this as a rejected cut and is programmed to remove the data concerning the rejected and removed cut from the sequence of data which is fed to the bag producing machines 22 in the current cycle.

Figure 22:
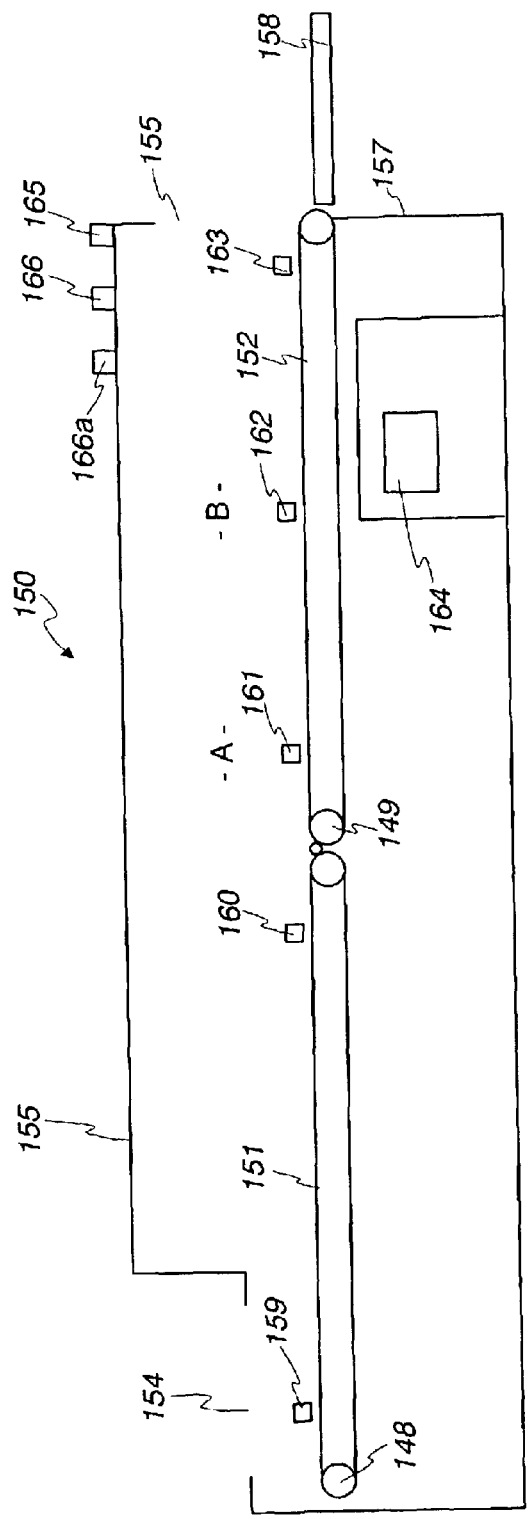
FIG. 22 is a schematic view of a retrim conveyor.

Cuts which fail to pass inspection at the inspection station 225 because they do not meet the required specification may be made acceptable by further trimming or might still be commercially useful. Rather than being discarded, such cuts may be placed on a retrim conveyor 150. Referring to FIG. 22, the retrim conveyor comprises a pair of endless conveyor belt assemblies 151, 152 mounted in tandem in a cabinet 153. The belts are driven by conventional end pulleys connected to motors indicated at 148, 149 respectively. The cabinet is substantially enclosed but has a first opening 154 in its upper wall 155 and a second opening 156 in its end wall 157. A retrim table is positioned adjacent the opening 156. Two optical sensors 159, 160 of the "through beam" type are mounted above the conveyor 151 and three further such sensors 161, 162, 163 are mounted above the conveyor 152. The sensors are connected to a controller 164 which, besides being connected to the processor 34, is also set to control the motors which drive the belts 151, 152.

A cut (say "cut #1") for retrim is placed on the left hand end of the conveyor 151 through the opening 154 is initially sensed by the sensor 159. The sensor 159 thereupon transmits a signal to the controller 164 which relays the information to the processor 34. The processor has already received from the sensor 130b via the controller 119 information that cut #1 (the identity of which is known) has been removed from the conveyor 108/181. This information is used by the processor to verify the identity of cut #1 when it passes through the retrim conveyor.

The controller 164 is set to control the operation of the conveyors 151, 152 from this juncture as follows:

Controller 164 will already have received signals from one or more of the sensors 160, 161, 162 if other cuts are present on the conveyors 151, 152. If no such signals have been received, the controller will actuate the conveyors to carry cut #1 to position A where when it is sensed by sensor 161. In response thereto conveyor 152 is stopped. A switch 165 actuated by the retrimmer causes the conveyor 152 to carry cut #1 through the opening 156 to the retrim table 158. Otherwise conveyor 152 will remain stopped until a second cut (" cut #2) is placed on conveyor 151 and sensed by sensor 159. If this occurs the conveyors will move cut #2 to position A. At the same time conveyor 152 will carry cut #1 to position B where it is sensed by sensor 162.

By similar sequencing, the controller 164 is able to control the conveyors 151, 152 so that up to three cuts are held ready for retrimming at positions where they are sensed by sensors 160, 161 and 162.

Because of friction, a cut carried to the end of conveyor 152 will come to a halt when it comes into contact with the retrim table 158. Similarly to the case of the conveyor 243 in the magazine 239, the conveyor 152 is immobilised when any cut is sensed by the sensor 163 in this position. The conveyor can only be reactivated after the retrimmer manually moves the cut onto the retrim table and operates the switch 165.

The controller 164 is connected to a visual alarm 166 and an audible alarm 166a. The controller will activate the visual alarm when three cuts are held in the retrim conveyor and the audible alarm when four cuts are so held. In the latter event, the processor 34 is programmed to bring the boning line 101 and the conveyor 108/181 to a halt when sensor 159 signals controller 164 that the fourth such cut has been placed where it is sensed by sensor 159. The processor 34 is programmed to restart the boning line and the conveyor 108/181 only when there are no cuts in positions where they are sensed by sensors 159 and 160.

The cuts are retrimmed at the retrim table 158 in the sequence in which they are fed to the retrim conveyor 150. If it is decided that a cut is to be discarded it is placed in a bin 167 and at the same time the retrimmer pushes a pushbutton 166 which sends a signal via the controller 164 to the processor that the data concerning the cut is to be removed from the system controlling the labelling of the bagging machines 22. Otherwise, as soon as each cut has been retrimmed it is placed on a conveyor assembly 168 which is substantially identical in construction and function to the conveyor assembly 120 described above. The assembly 168 is driven by an end pulley/drive motor assembly 168. The load cell 170 of the assembly 168 is connected to the controller 164 via a converter 171 which, on registering that a cut has been placed on the belt of the assembly 168 transmits a signal to the processor 34. As already noted, the processor 34 already knows when there is a clear space on the conveyor 108/181. The processor will send a return signal to the controller 164 which will activate the motor 168' causing the belt at the appropriate time to deposit the cut in the empty space on the conveyor. From the signals already received from the controller 164 derived from the sensors 159–163 and the pushbutton 166, the processor is able to verify the identity of each retrimmed cut placed on the conveyor 108/181 by the retrimmer.

As in the case of the conveyor assembly 120, the load cell of the assembly 168 may be set to weigh each retrimmed cut and this weight will be transmitted to the processor 34.

In all cases the conveyors are of course provided with suitable drive means and washing facilities. These are conventional and have been shown only schematically in the drawings.

Thus the outputs of a meat packing process incorporating the invention include: (a) weighed, identified, accurately labelled cuts of meat, bagged in bags of optimum size and traceable back to each source anrimal and the time and place at which the cuts were packed; and (b) quantifiable amounts of waste which may occur at each boning and trimming station and the ability to detect wasteful trimming practices; and (c) the ability to quantify the yield of individually identified carcasses.

Even if the plant operator is not interested in carcass identification, since the cuts coming off any one trimming table are always (or can be arranged to be) of the same type, general information could be derived about those cuts from animals from a mob, as long as the first and last carcasses derived from animals from a mob and processed through the plant are known.

The ability to determine the yields of carcasses and to monitor the efficiency of the boners and trimmers is useful to the plant operator even if the cuts are not bagged.

Use of the bagging machines 22 reduces wastage and inventory of packing materials.

Much physical effort is required to handle large cuts, such as cuts of beef. The conveyor 108' described with reference to FIGS. 8 and 10–13 does away with the need to transfer the cuts to and from the conveyor at the bagging station and also does away with the need for a loading fork of the type shown in FIG. 6 and for devices (such as the devices 130) for weighing the cuts before they are placed on the conveyor.

The conveyor 108' comprises a bed 204 on which an endless chain 203 slides. The chain 203 is driven by an electric motor through a suitable conventional drive train. The chain is arranged to follow curves in the bed which, in the present example, lie in the horizontal plane. To this end the chain is made up of upper 205 and lower 206 rows of link assemblies 207. The links in the two rows 205, 206 are joined together by vertically disposed pins each of which carries a roller 209. At regular intervals the rows 205, 206 of links are joined together by brackets 210 mounted on lugs 211 forming part of the links. Each bracket 210 supports a fork 212 the construction of which is similar to the fork 10 described above. However, in the present example the fork 212 requires no load cell nor sensors for sensing the weight and length of a cut. Neither does the fork require bag opening means. The ends of the bars 208 are therefore closed. The fork 212 is sup ported on a vertical post 213 which is mounted on the bracket 210 through a simple bearing arrangement 219 so as to be able to pivot about a vertical axis.

In similar manner to the conveyor 181, each post carries an array of metal rings or discs 132 which are arranged in a pattern which is unique to each fork. Arrays of capacitive sensors 133 which are substantially identical to the sensors 194 are mounted adjacent each trimming station and adjacent the bagging station. Each array of sensors is connected to the processor 34 via a controller 224. In the same way as already described in connection with the conveyor 181, the signals generated by the arrays of sensors 194 as the post of each fork passes each trimming station and the bagging station are transmitted to the controller 224 and thence to the processor 34. By these signals the processor identifies each fork at the trimming stations and verifies the identity of that fork when it arrives at the bagging station.

Since the distance between each pair of forks is constant, the processor is also able, if necessary, to monitor the speed of the conveyor.

Figure 8:
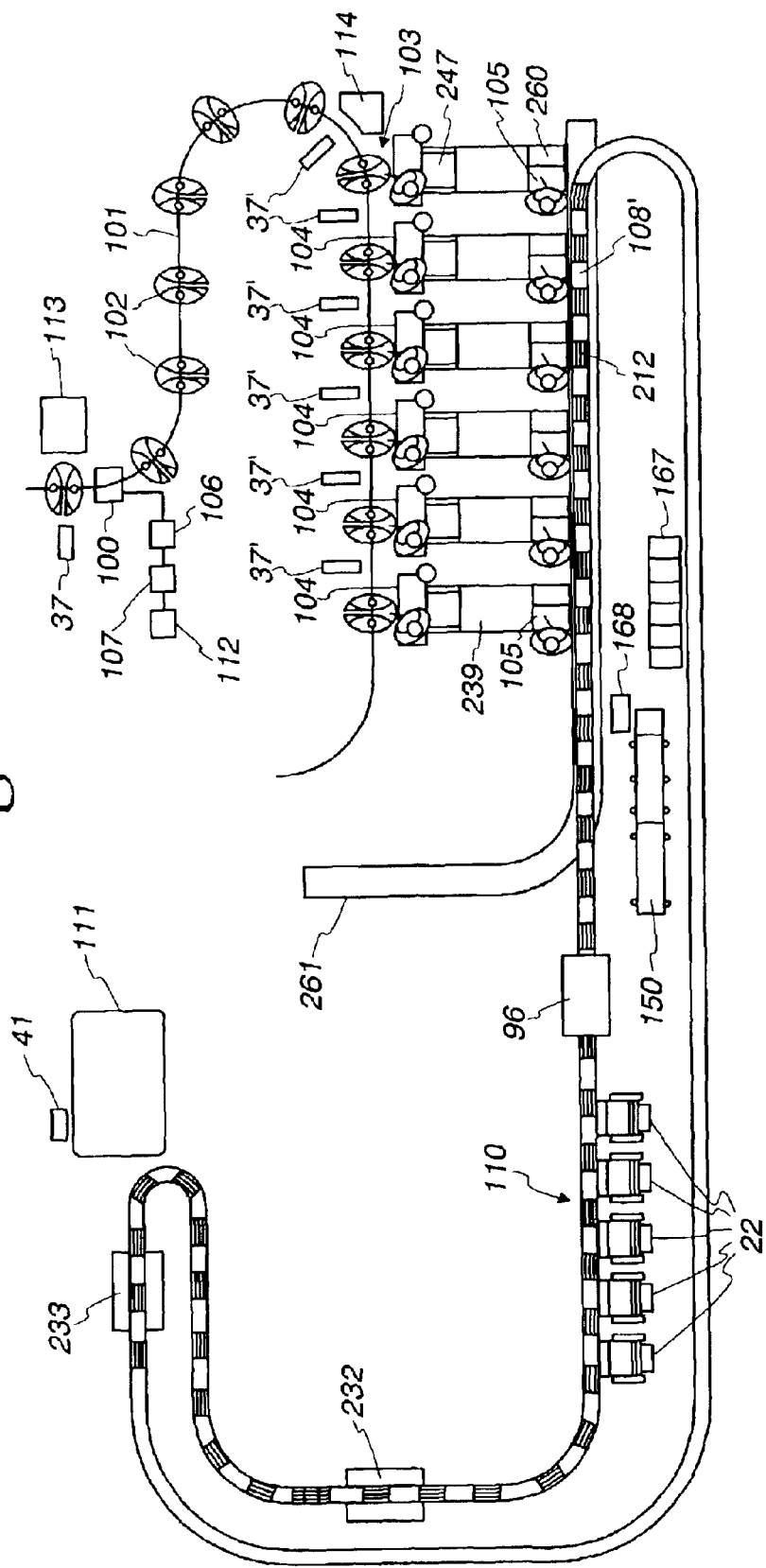
FIG. 8 is a diagram of a second layout of part of a meat processing and bagging plant.

Only some of the forks 212 are illustrated in FIG. 8.

The bed 204 is of rectilinear cross sectional shape, having an upright rear wall 214 with upper and lower flanges 215, 216 welded thereto. There is an opening between the flanges. The upper and lower rows of links 205, 206 are housed between, and supported by, the wall 214 and the respective flanges 215, 216. The chain slides on a wear plate 218 fixed to the horizontal inner face of the lower flange 216. The bracket 210 projects through the opening between the flanges.

The conveyor 108' advantageously has a facility for sensing the placement of each cut on the conveyor and for weighing the cut at the same time. This may be achieved, for example, by providing weighing devices 230 which weigh the cuts immediately after they have been placed on the forks 212. These weighing devices are located one adjacent each trimming table and connected through suitable circuitry to the processor 34.

Figure 13:
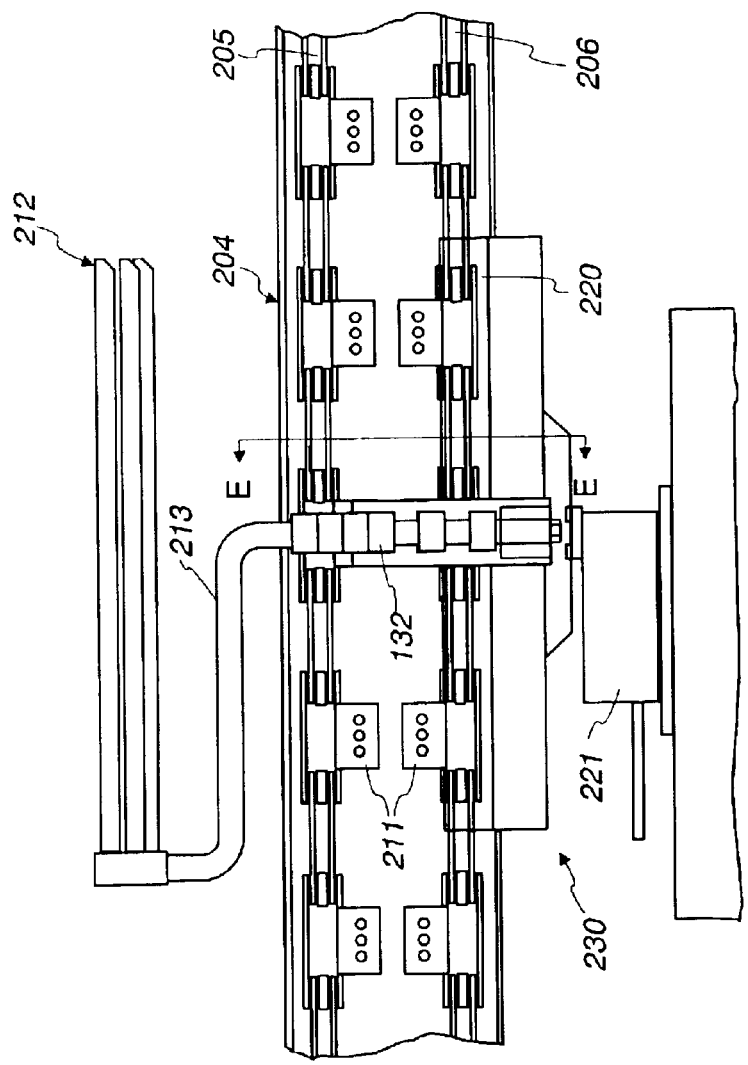
FIG. 13 is a view of on Arrow D in FIG. 12 with part of the conveyor broken away.
Figure 12:
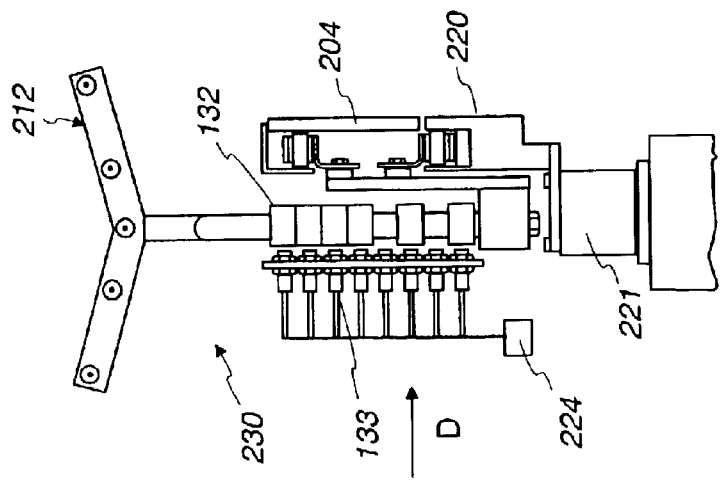
FIG. 12 is a cross sectional view, on Arrows E—E in FIG. 13, of a weighing device with which the fork conveyor is provided.

A suitable weighing device 230 is shown in FIGS. 12 and 13. Adjacent each trimming table a portion 220 of the wear plate which is of shorter length than the distance between two adjacent forks 212 is mounted on a load cell 221. The forks 212 are of known, uniform weight and the load cell 221 is deflected by a constant amount by each fork 212 which passes over the portion 220. This deflection will increase if a cut is placed on the fork. The load cell is calibrated to detect any such increased deflection and thereupon to provide a signal through the controller 224 to the processor 34 which registers that a cut has been placed on the fork and also the weight of the cut. The processor also registers the locality (i.e. the particular portion 220) from which the signal is received and the time intervals between such signals. Upon receiving the signal the processor registers that a cut of known weight has been placed from a particular trimming station (say station "A") on a fork 212 (say fork "A") whose identity, as noted above, is established. This information is transmitted by the processor to the controller 5 which controls the bagging machine. By comparing the signals transmitted by the array of sensors 133 at the bagging station with the signals transmitted by the sensors 133 at the trimming tables and detecting identical such signals, the processor is able to identify fork A when fork A arrives at the bagging station. From this the processor is able to establish the identity of each cut on a fork 212 at the bagging station, provided that such identity was already established when the cut was placed on that fork at the trimming station in the manner already described.

A device 96 is provided between the trimming tables and the bagging station for measuring the length and width of each cut. The device 96 may conveniently comprise a pair of gates which are constructed and which function in the same way as the gates 65, 66 described below. If such a pair of gates is used, each fork should be modified so that the bars 208 thereof lie in horizontal plane.

The length and width of each cut, as determined by the device 96, are transmitted to the processor 34. The processor is programmed to cause the machine 22 which is loaded with the tube stock of width which matches the width of the particular cut to produce a bag whose length corresponds to that of the cut. The weight of the cut and, optionally, other information such as its identity and source is imprinted on the bag which is produced before the cut arrives at the bagging station.

The device 96 may alternatively comprise an array of light activated sensors carried on a bar which is similar to the bar 12' described above. The bar is disposed above and athwart the conveyor 108'. The sensors are directed downwardly. When a cut of meat passes under the bar, it will move through the proximity of a series of the sensors thereby activating those sensors. The remaining sensors in the array will not be activated. The number of sensors which are activated will depend on the width of the cut 24. The time interval during which the sensors are activated will depend on the length of the cut and the speed of the conveyor. The sensors are connected to a controller which transmits to the processor 34 a signal corresponding to the width of the cut as determined by the number of sensors which are activated as aforementioned. It is sufficient for present purposes that the sensors are spaced 25 mm apart. The controller also sends a signal to the processor corresponding to the aforementioned time interval. The processor is programmed to convert this signal to a measure of the length of the cut. One of the machines 22 is thereby caused to produce a bag of the appropriate length and width as described in the previous paragraph.

A pair of convergent guide rails may advantageously be located one on either side of the conveyor 108'. The forks 212 pass between the guide rails which serve to align the forks in the direction of travel of the conveyor 108' before the forks pass through the device 96.

The cuts are bagged at the bagging station without being removed from the forks 212.

The bagged cuts are removed from the conveyor 108' only after being carried to a vacuum packing station 111. The ability of the fork 212 to pivot on the bracket 210 is of considerable assistance to the operator in this operation. The operator waits until the fork on which the bagged cut is carried has passed him before gripping the bagged cut. The movement of the fork away the operator is used to assist the operator in drawing the bagged cut off the fork.

It is possible that a particular cut loaded on the conveyor 108' may not get bagged as it passes the bagging station. This can be detected in various ways. For example, a device 233 which is substantially identical in construction to the weighing device 230 may be provided in the conveyor 108' downstream of the vacuum packing station 111. If a cut is not bagged it will not be subjected to the vacuum packing procedure and will not be removed from the fork 212 at the vacuum packing station. The load cell of the device 233 is calibrated to detect the presence of such a cut on a fork 212 by its weight and to transmit a signal to the processor 34.

Alternatively the device 233 may comprise an optical sensor which is connected to the processor and which senses the presence of a cut on a fork after the fork has passed the vacuum packing station.

In either case the processor will register that the cut (whose identity is already known) has not been bagged. The cut may be carried around the conveyor 108' for a second cycle during which it is again monitored by the processor or may be removed after the cut has passed the device 233.

In either of the devices 233, 232 the load cell might also optionally be calibrated to transmit the weight of any cut on the fork to the processor. This could be useful for verifying the identity of the cuts as and when they pass the location of the devices 232, 233.

In FIGS. 15–18, a modified system for processing the cuts is shown. In this system, an endless conveyor 108/181 is provided which sequentially carries cuts from the trimming tables 105 to a bagging station in an arrangement similar to that shown in FIG. 7. The cuts are fed from the boning stations 104 to the trimming tables 105 through a magazine 239 substantially identical to the magazine described with reference to FIG. 14. Similarly, the cuts are fed from the trimming table onto the belt of the conveyor 108/181 by conveyor assemblies 120 which are substantially identical to the assemblies 120 described above.

The speed of the belt of the conveyor 108/181 is determined as described above.

An inspection tunnel 64 is located over the conveyor. An apparatus 59 is located in the tunnel which assesses the length, width and thickness (and possibly other characteristics) of each cut as it traverses the tunnel. Although, as discussed below, the weight of the trimmed cuts may also be assessed in the tunnel 64, it is considered preferable in the present example that the trimmed cuts are weighed by the assemblies 120. The weights are transmitted to the processor 34 and the bagging machines 22 in the manner already described.

The characteristics of each cut which are assessed by the apparatus 59 are transmitted to the processor 34 which in turn feeds the characteristics to the bag producing machines 22 and their associated printers 36. By this means a bag of optimum size for a cut, and imprinted with the weight of the cut and possibly its identity and other characteristics, is produced by one of the machines 22 before the cut arrives at the bagging station.

For measuring the length and width of a cut, the apparatus 59 comprises a pair of gates 65, 66 mounted with their lower edges just above the upper face of the conveyor 181. The respective outer edges of the gates are mounted on vertically disposed posts 67, 68 located adjacent either edge of the conveyor. The posts are mounted in bearings seated in upper and lower seats 69 in the framework 70 of the tunnel. By this means the gates can swing about the axes of the respective posts to and from the position shown in the drawings. In this position the gates may be regarded as closed and are disposed inner edge to inner edge in a common vertical plane which is perpendicular to the direction of travel of the conveyor. The gates are urged to the closed position by springs (not shown) housed in the upper seats 69.

The posts project upwardly from the upper seats 69. A sensor assembly 71 is mounted coaxially on the upper end of the post 68. The sensor assembly comprises a series of six substantially identical, interengaging annular rings 72 fixed to a cylindrical base member 73. The rings and the base member are of aluminium. The base member is mounted on ball bearings 74 carried on the post 67. By this means the sensor assembly and the post 67 can pivot relative to one another about their common axis 83.

The rings 72 define a cavity 81 in which is housed a semi-cylindrical armature 82 of aluminium fixed on the post 67. The armature can pivot unobstructedly within the cavity 81, carried by the post 67.

A collar 75 is fixed to the upper end of the second post 67. A lug 76 on the collar is connected through a ball and socket joint 77 to one end of a tie rod 78. The opposite end of the tie rod is connected through a second ball and socket joint 79 to a lug 80 on the base member 73.

Each ring 72 carries an inductively actuated switch 84. Switches of this type are commercially available. The lowest ring 72' is oriented so that its switch 84' is in the proximity of the armature only when the gates are closed. The upper five rings 72 are oriented so that their respective switches 84 are at progressively increasing angular distances from the switch 84'. During the time that the armature, pivoting in the cavity, moves out of, and then back into, the proximity of the switch 84', the switch 84' closes and passes a current from a low voltage source 98 to the controller 119, 195. Similar currents are passed to the controller by the switches 84 in the upper rings 82 when the armature moves into their respective proximities. The controller converts these currents to digital signals which are transmitted to the processor 34. The processor is programmed to register the time at which, and also the particular switch by which, each current is transmitted to the controller.

Any cut carried on the conveyor will cause the gates 65, 66 to open for a time interval determined by the length of the cut and the speed of the conveyor. The angular distance by which the gates open will be determined by the width of the cut. Moreover, due to the construction of the ring 72 and armature 82 assembly, within limits the opening distance of the gates is independent of the position of a cut on the conveyor 181. When the gates open the armature pivots from the position which it occupies when the gates are closed into the proximity of a number of the switches 84, which number depends on the width of the cut. The signals corresponding to the currents passed by these switches are converted by the processor, which is suitably programmed for the purpose, to a measure in stepped increments of the width of the cut. By relating the speed of the conveyor to the duration of the time interval during which the signal corresponding to the current transmitted by the switch 84' is received, the processor is able to calculate the length of the cut.

For measuring the thickness of the cut a single gate 85 is suspended with its lower edge just above the conveyor 108/181. The upper edge of the gate is mounted on a horizontally disposed bar 87. As in the case of the posts 67, 68 the bar 87 is carried in bearings seated in seats 88 formed in the framework 70 of the tunnel. By this means the gate 85 can swing about the horizontal axis of the bar 87 from the closed position shown in the drawings.

A sensor assembly 89 is mounted on the framework adjacent one end of the bar 87. The sensor assembly 89 comprises an armature 90 and an assembly 95 of switch carrying rings 91, 91' constructed and functioning in similar fashion to the assembly 71.

However, in the present case the armature 90 is non-pivotally fixed to the framework 70. The ring assembly 95 is connected through a link arrangement 92 to the end of the bar 87. Any cut carried on the conveyor 181 will cause the gate 85 to swing open and the ring assembly 95 is caused through the link arrangement to pivot about the armature 90 from the position which it occupies when the gate is closed. This movement causes currents to pass to the controller 119, 195 through the switches 93, 93' in the rings 91, 91' in the same way as happens with the switches 84, 84'. The controller converts these currents to digital signals which are converted in the processor 34 to a measure of the distance in stepped increments by which the gate 85 has moved from the closed position, and hence a measure of the thickness of the cut. The duration of the signal corresponding to the current passed by the switch 93' is determined by the length of the cut and the speed of the conveyor. This time interval may be measured by the processor 34 to determine the lengths of the cuts or to verify the lengths determined by the gates 65, 66 as described above.

Figure 15:
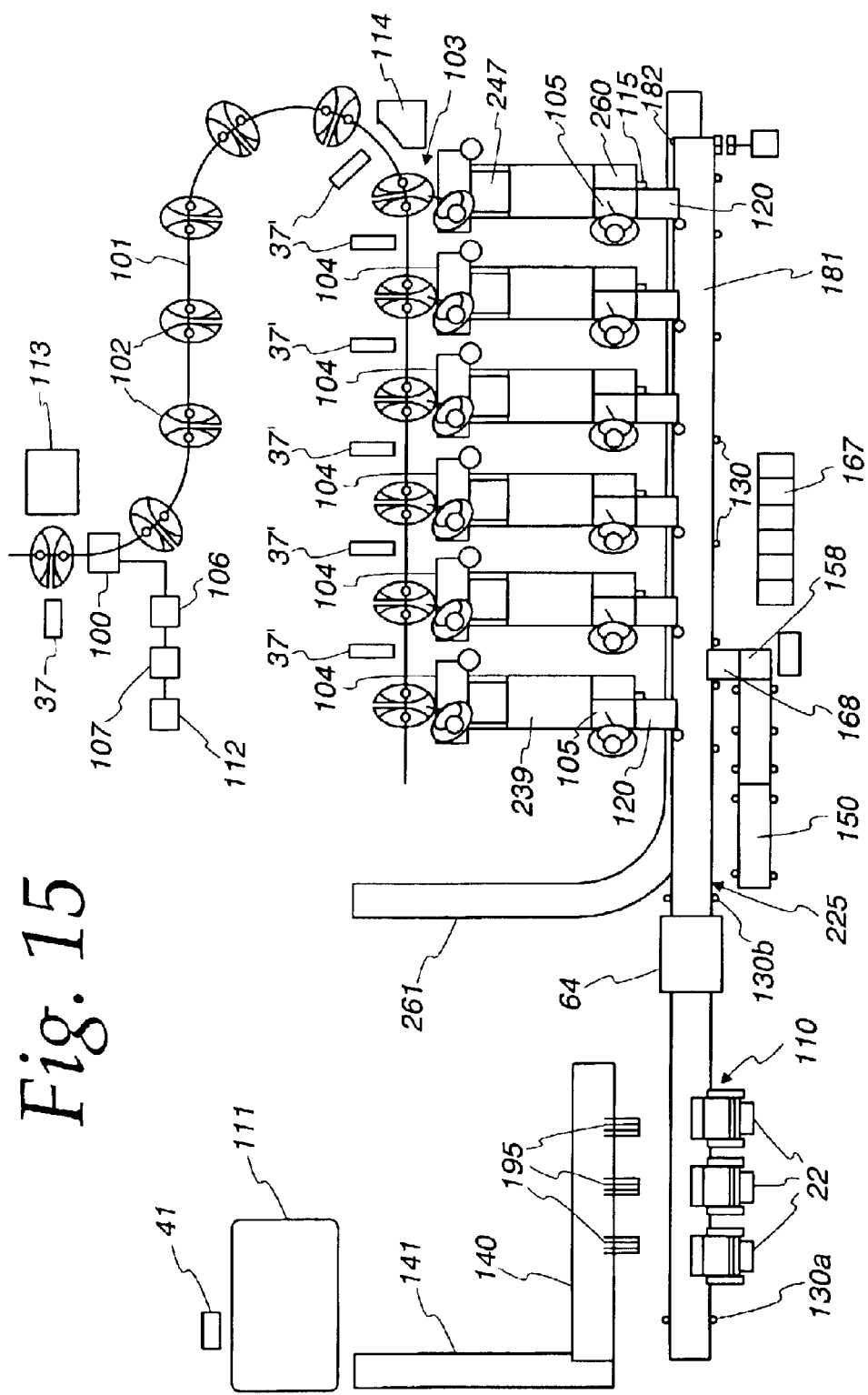
FIG. 15 is a diagram of a modified layout of part of a meat processing and bagging plant.
Figure 16:
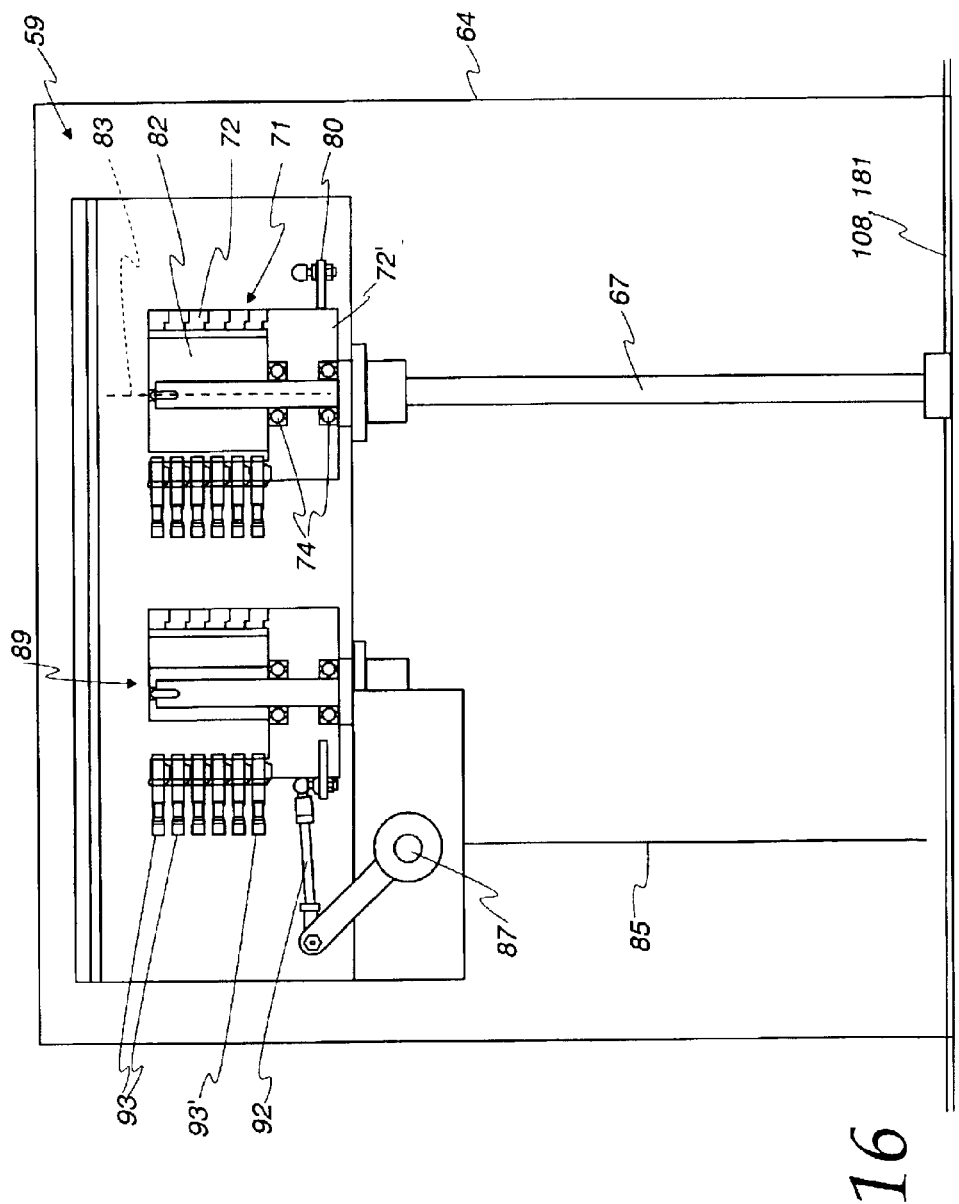
FIG. 16 is a cross sectional side view (on Arrows C—C in FIG. 17) of apparatus for measuring the size of cuts of meat.
Figure 17:
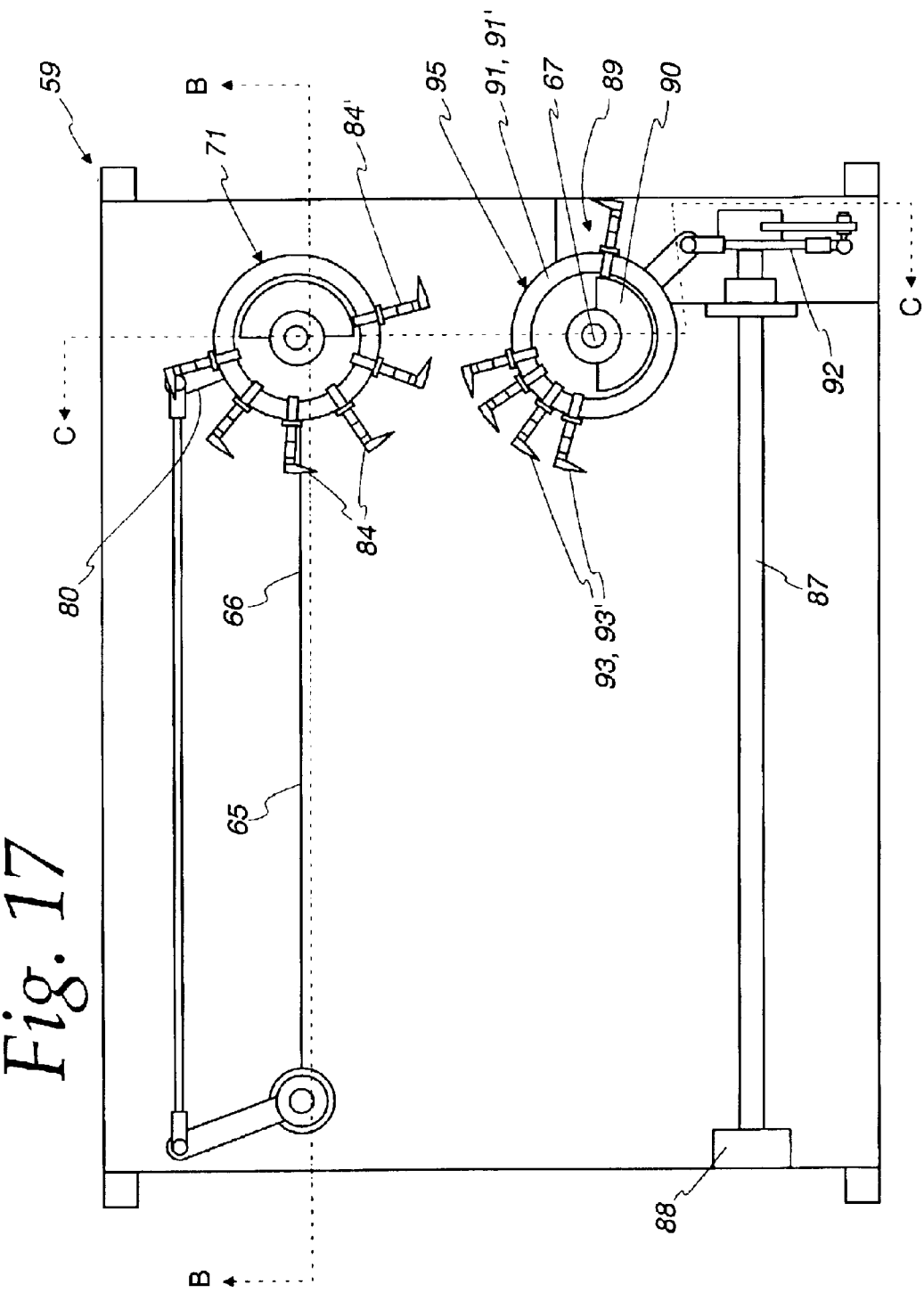
FIG. 17 is a plan view of the apparatus shown in FIG. 16.
Figure 18:
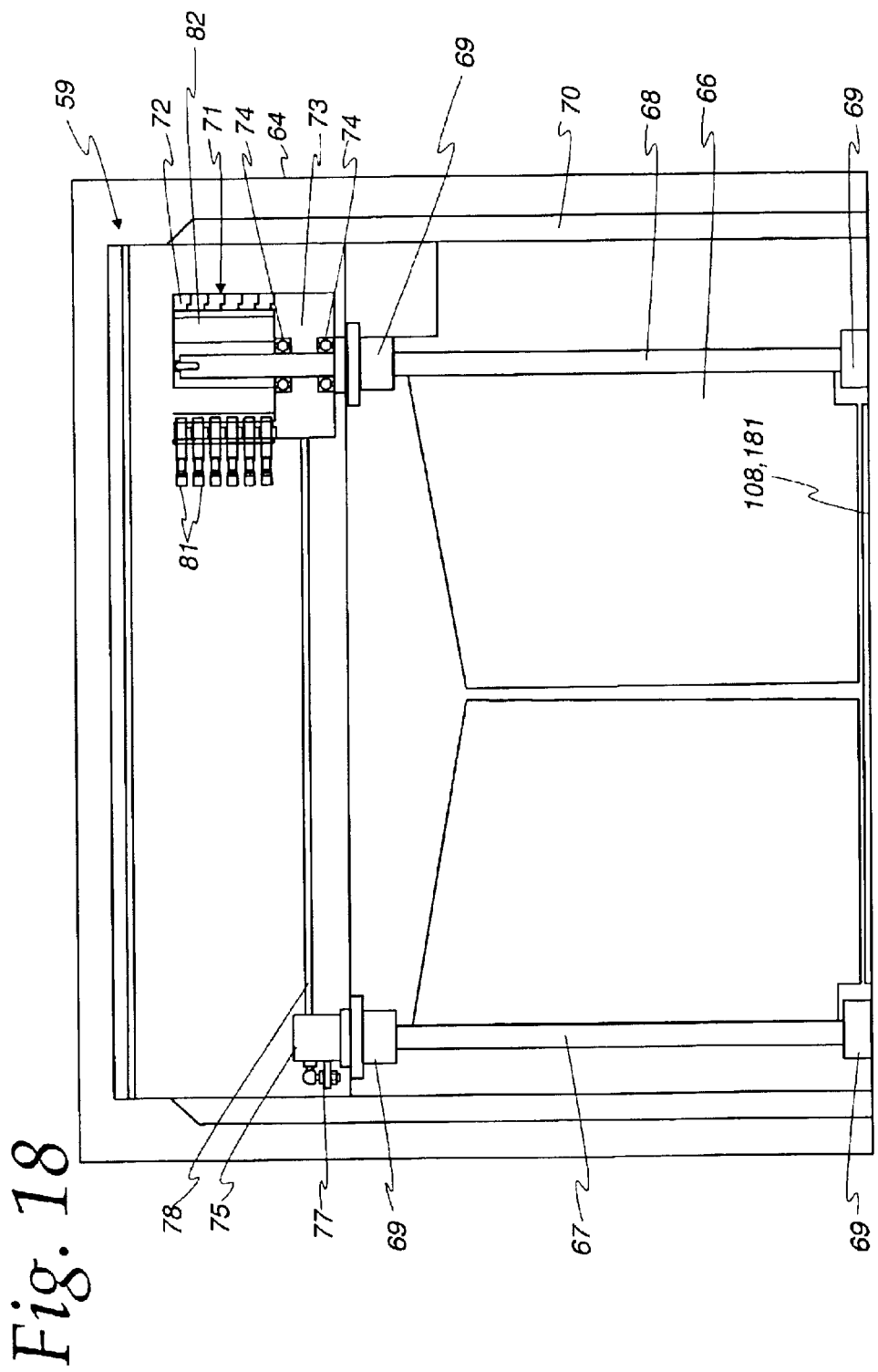
FIG. 18 is a view on Arrows B—B in FIG. 17.
Figure 21:
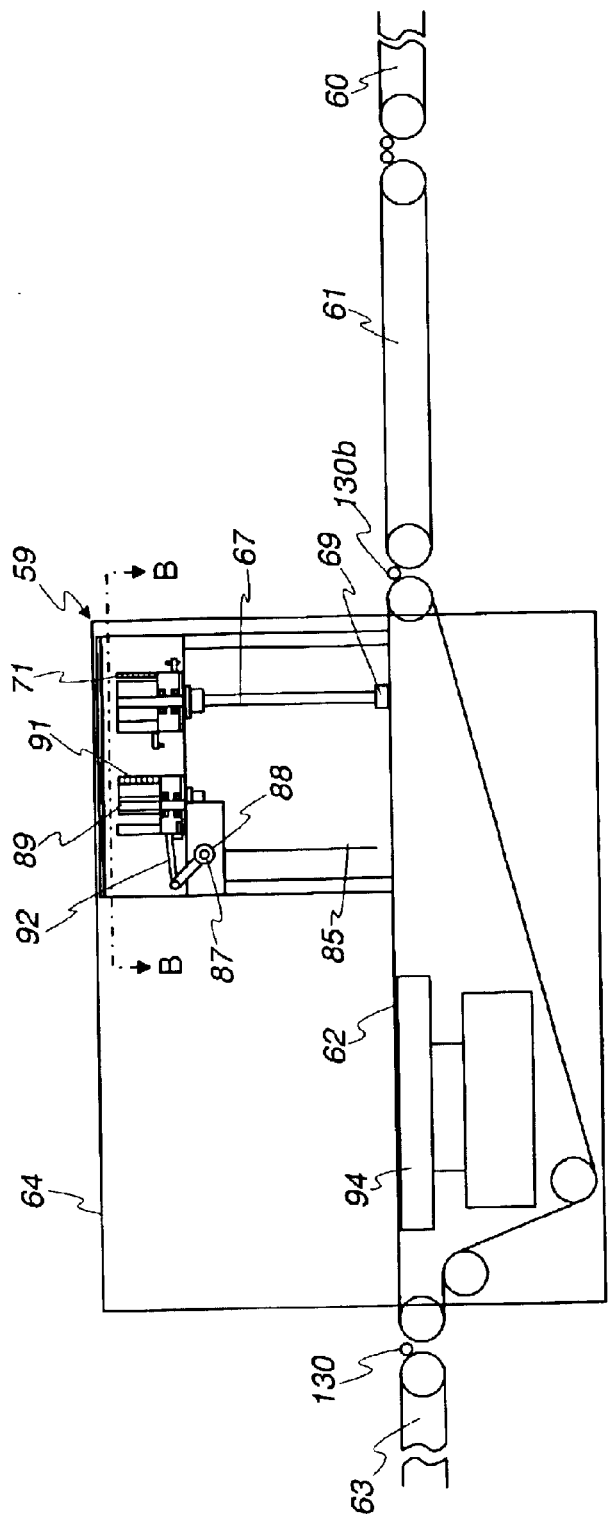
FIG. 21 is a schematic side view yet another modification to the conveyor shown in FIG. 15.

In the modified system shown in FIG. 21, the conveyor 108/181 is replaced by four endless conveyors 60, 61, 62, 63 which sequentially carry the cuts from the trimming tables to the bagging station and vacuum packing station in a similar arrangement to that shown in FIG. 15.

The first conveyor 60 traverses the trimming tables 105 in the same manner as the conveyor 108/181. The conveyor 60 conveys cuts deposited thereon at the trimming tables to the second conveyor 61. The second conveyor 61 in turn conveys cuts to the third conveyor 62. An inspection tunnel 64 is located over the conveyor 62 which forms part of an apparatus 59 which is substantially identical to that described above. The third conveyor 62 feeds the cuts to the fourth conveyor 63 which carries the cuts to the bagging station 110. Conveyor 62 is set to run at a higher speed than conveyor 61 which in turn is set to run at a higher speed than conveyor 60. This helps to ensure that there is a space between each pair of cuts by the time that they pass into the tunnel 64.

After passing through the gates 65, 66 and 85, the cuts are conveyed by the conveyor to a weigh station where a load cell 94 is provided for weighing each cut. In this embodiment it is thus not necessary for the cuts to be weighed by the conveyor assemblies 120 at the trimming stations although this might be desirable for verifying the identity of the cuts passing through the inspection tunnel. The processor 34 is programmed to bring the conveyor 62 to a stop when it receives signal from the controller 119 associated with the sensors 130 upstream of the load cell 94 in order for each cut to be weighed at weigh station 94.

The conveyor belt assembly 120 used in the various examples described above may be replaced by a more complex assembly substantially identical to the apparatus 59 comprising a conveyor belt, gates for measuring the length, width and thickness of a cut carried by the belt therethrough and a weighing device for weighing such cut together with the associated electronic equipment for transmitting the weight and size data to the bagging machines 22 and for registering the time at which the cut is placed on the conveyor 108/181.

In any case in which the cuts are weighed and measured for length and width, the forks 10, 10' or 10" at the bagging station may be replaced by a simple fork or forks which need have no capability of measuring the size or weight of the cut. The length, width, thickness and weight of each cut is fed by the processor to the bag making machines 22 so that a labelled bag of the right length will have been produced and will be ready for use when the cut arrives at the bagging station.

FIG. 23 illustrates the flow of information as a carcass, originally on a boning line 101, is converted at the bagging station 110 into bagged cuts, After being removed from the carcasses, the cuts pass through a assembly 239, a trim table 105, a conveyer 108/181, optionally back through a re-trimming loop 158, and so to the bagging station.

A carcass scanner 37 collects the original data relating to the animals being processed and passes weight information and identity information to the processor 34, which is a computer or computer system optimised to handle messages to and from a number of ports, to store these messages in sequences, to "map" cuts as they are sent from boning stations 105 to the conveyer 108/181, and to identify and individually label the bagged cuts using a printer. The cuts are tracked throughout the procedure by keeping track of their positions as they pass in a controlled manner through the materials handling devices and past the workstations. In FIG. 23 the ovals indicate the kind of data that passes along a connection and the box, such as "identify by sequence", indicate the tasks carried out within the processor 34. Because these processes are "threads" which may operate simultaneously, rather than an ordered sequence, a conventional flow chart does not apply.

The sequence identification procedure may be rendered down into a number of stages:

(1) Receive the initial order of carcasses. Take note of any that may be rejected for reasons such as failing a regulatory meat inspection procedure. ("General information" 114 can provide for this type of modification, and can allow for input of data beyond that which is carried on scannable bar-codes.

(2) Assume that the order in which carcasses arrive at the boning sections matches the order of untrimmed cuts, so that the cuts ready for placement onto the conveyer 108, 181 are, at any single workstation, in the same order as the carcasses.

(3) Holding a "mental map" of the type and identity of cuts being transported along the conveyer 108, 181 is not so simple. Because the timing of cuts ready for placement is not precise, the processor 34 must in some way "find out" the origin of any cut placed on an empty position on conveyer 108, 181. This is done by relating the disappearance of weight from the load cell 123' at a time that corresponds to the proximity of a known-empty position on the conveyer. This position is subsequently known to become filled, using the array of proximity sensors 130 located along the conveyer 108, 181 (one is shown in FIG. 23 as the sensor for a cut about to be bagged).

(4) Results from the measurement tunnel may provide a check for identification.

(5) Finally, once the bagged cuts are labelled, the system relinquishes control to conventional pack handling techniques.

(6) Additional reports and analysis 232 provide a variety of optional information such as the amount of usable meat obtained from one or a group of animals, the performance of workers, and the output from the factory.

FIGS. 24–31 are closed loop flow charts.

Figure 24:
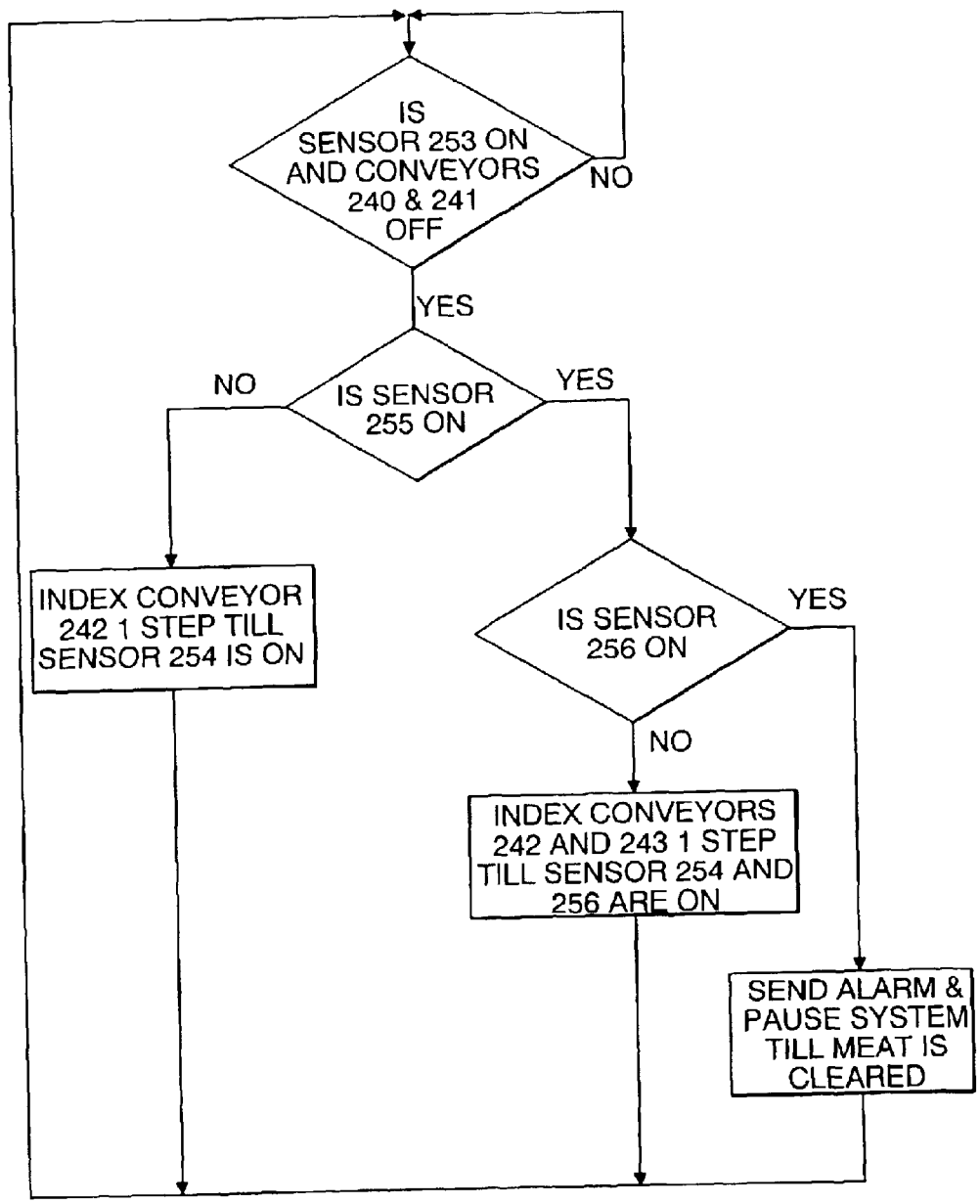
FIG. 24 is a flow chart showing the stacking sequence for the magazine shown in FIG. 14.

FIG. 24 illustrates some details of the control of the stacking sequence used in the magazine 239. The system accepts inputs from a number of "presence" sensors 253, 254, 255, and 256 and motion sensors 240 and 241, and can cause the conveyors that are built into the materials handling device to advance until such time as sensors 254 and 256 are ON, indicating that a cut is ready for trimming. If sensor 256 indicates presence at an initial epoch of the loop, the magazine is determined to be full and will pause until meat is removed.

Figure 25:
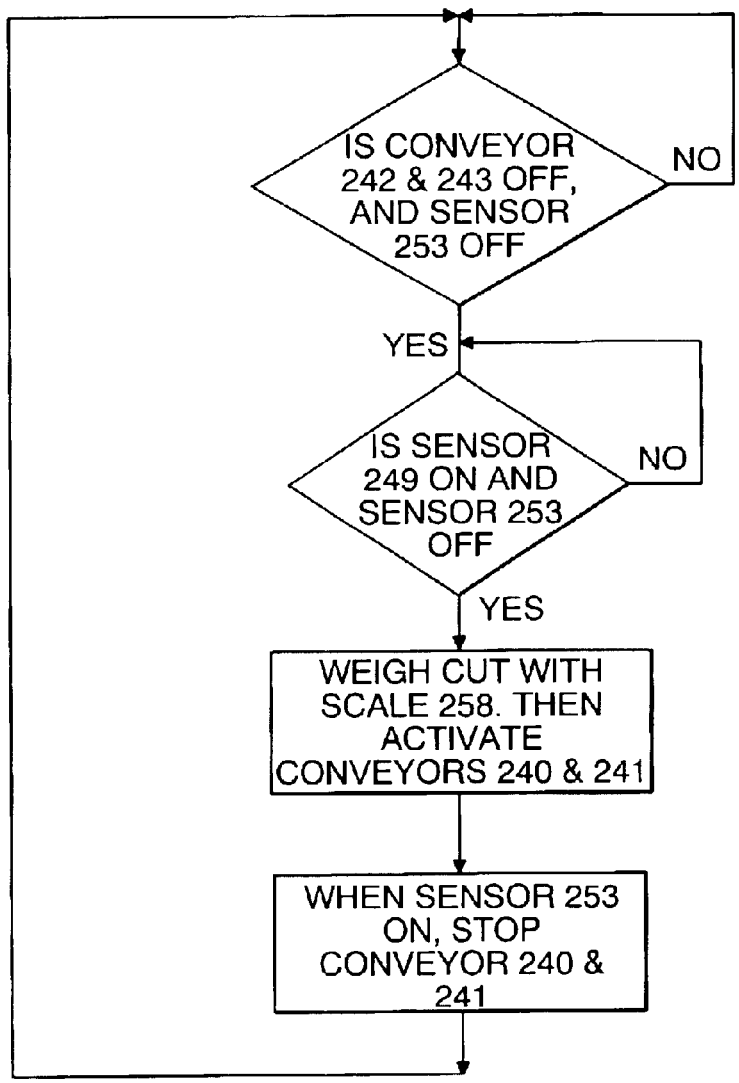
FIG. 25 is a flow chart showing the weighing sequence for the magazine.

FIG. 25 illustrates some details of the control of the weighing sequence used in the magazine. The system accepts inputs from "presence" sensors 249 and 253 and motion sensors 242 and 243, and can cause the conveyors that are built into the materials handling device to advance. When sensor 249 is ON and sensor 253 is OFF, a cut is ready in position for weighing. On completion of the weigh process the conveyor is again advanced.

Figure 26:
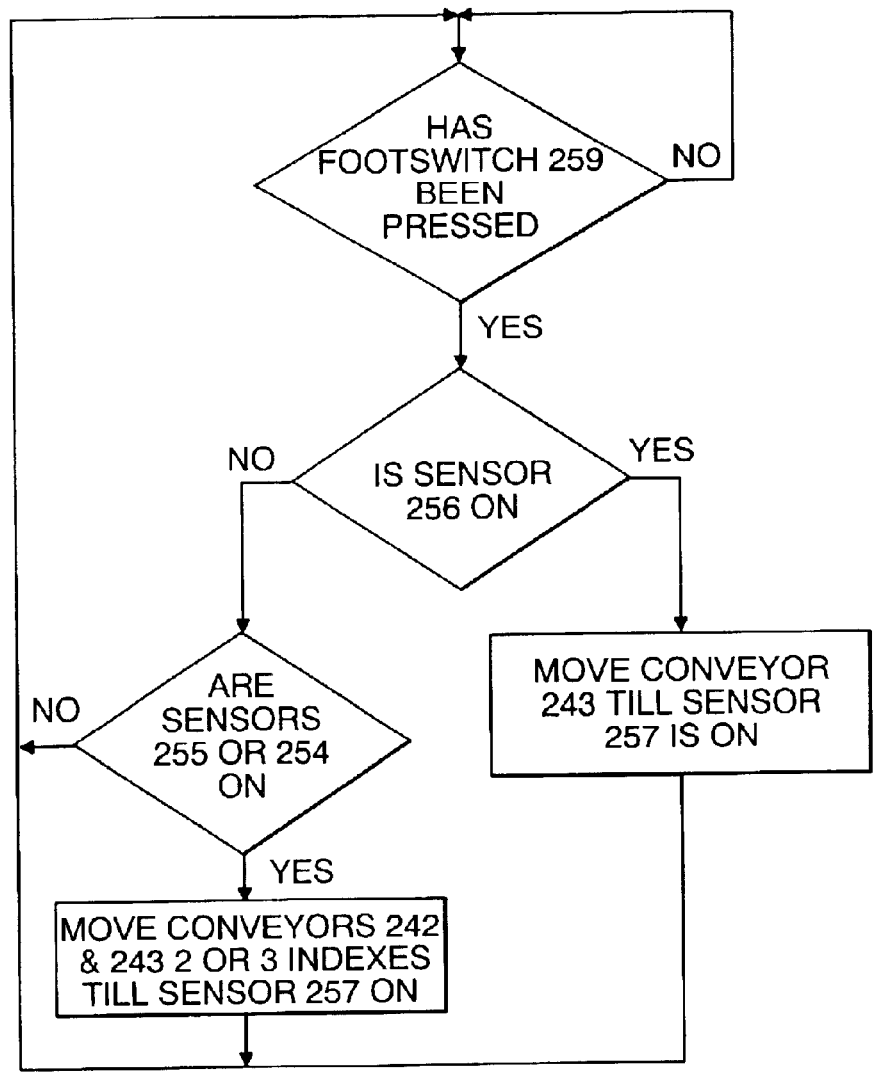
FIG. 26 is a flow chart showing the sequence for a foot switch for the magazine.

FIG. 26 illustrates some details of the foot switch control for the magazine. The system accepts inputs from a footswitch 259 as well as from a number of "presence" sensors 254, 255, 256, and 257, and on receipt of a footswitch trigger it will advance the belts in the magazine until sensor 257 comes ON, indicating that meat is ready for picking out from the magazine.

Figure 27:
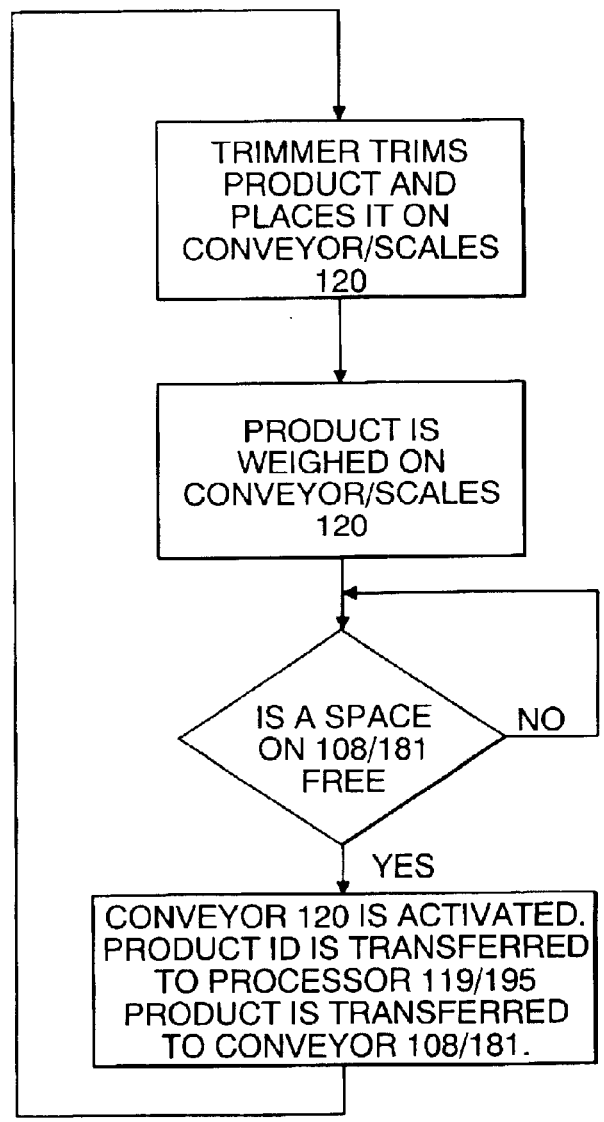
FIG. 27 is a flow chart showing the meat transfer sequence for the magazine.

FIG. 27 illustrates some details of the meat transfer sequence for transferring cuts after trimming onto the conveyer 108, 18 1. The system accepts inputs from a conveyer scale 120 which causes the loop to become active, so that the weight of the trimmed cut is passed to processor 34. Processor 34 then determines where the next available free compartment on conveyer 108, 181 is sited and activates conveyor 120 at the appropriate time, so that the cut is transferred. At the same time, the product identification is transferred to that part of processor 34 responsible for "mapping" the materials held on the conveyor 108, 181. In the system comprising the conveyor 181, each individual cell is given a unique number. The processor 34 maintains a table of compartments and their contents. The "Product ID" is transferred from a table corresponding to a compartment on the conveyer 120 when an item is passed to the conveyer 108, 181.

Figure 28:
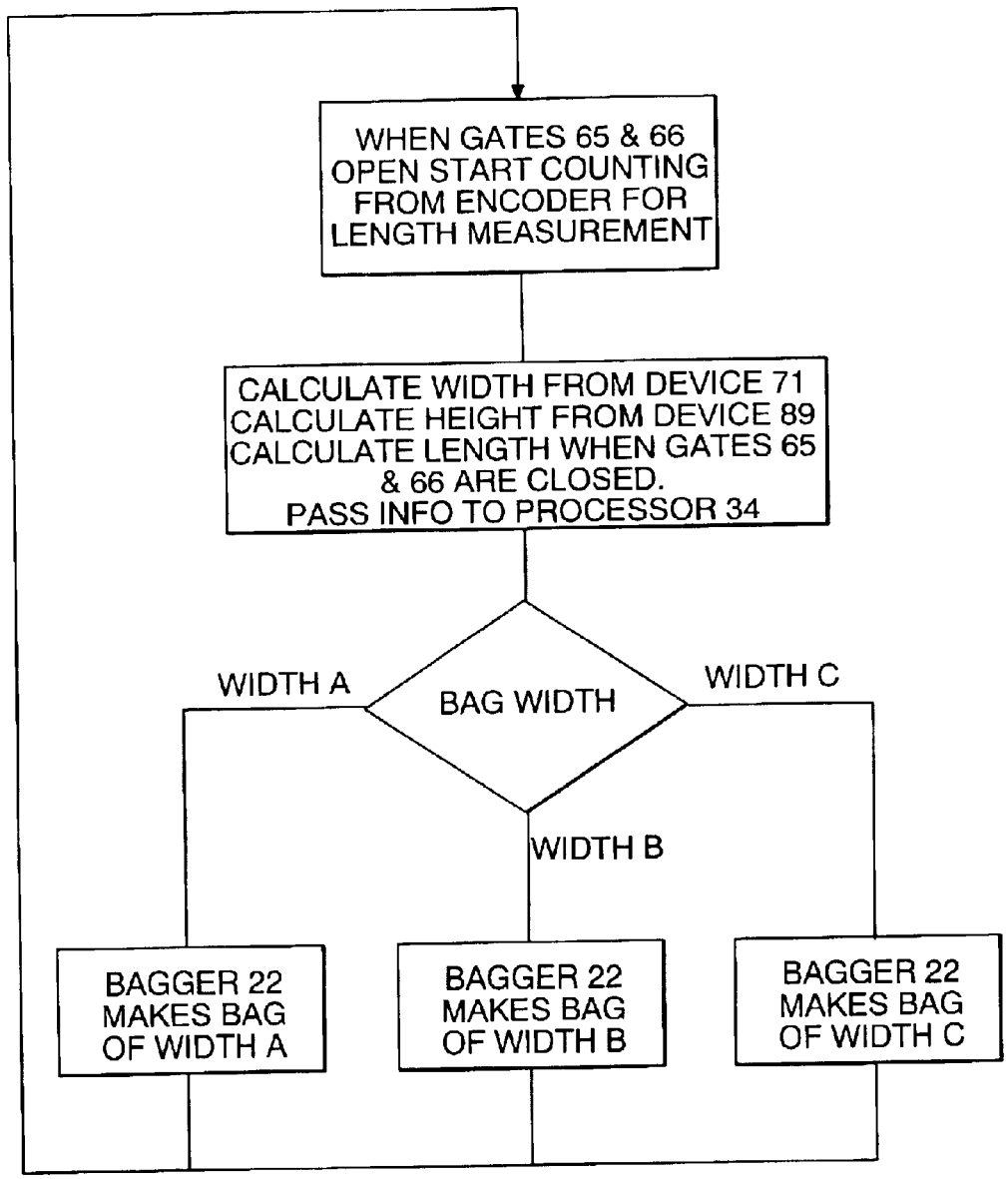
FIG. 28 is a flow chart showing the procedure for the measurement tunnel.

FIG. 28 illustrates some details of the control instructions flowchart for managing the cut length, width and height (thickness) measuring devices provided within the measuring tunnel 64 in FIG. 15. This flow chart also includes a section to select an appropriate bag width and then select a machine 22 which provides a bag of the selected size. Opening of the gates 65, 66 triggers length measurements. Height and width measurements may be derived from devices 71, 89. Information is passed to the processor 34, which selects an appropriate machine 22 to produce the bag. At the same time, the processor passes bag label information to a printer 36, which applies a label to the bag.

Figure 29:
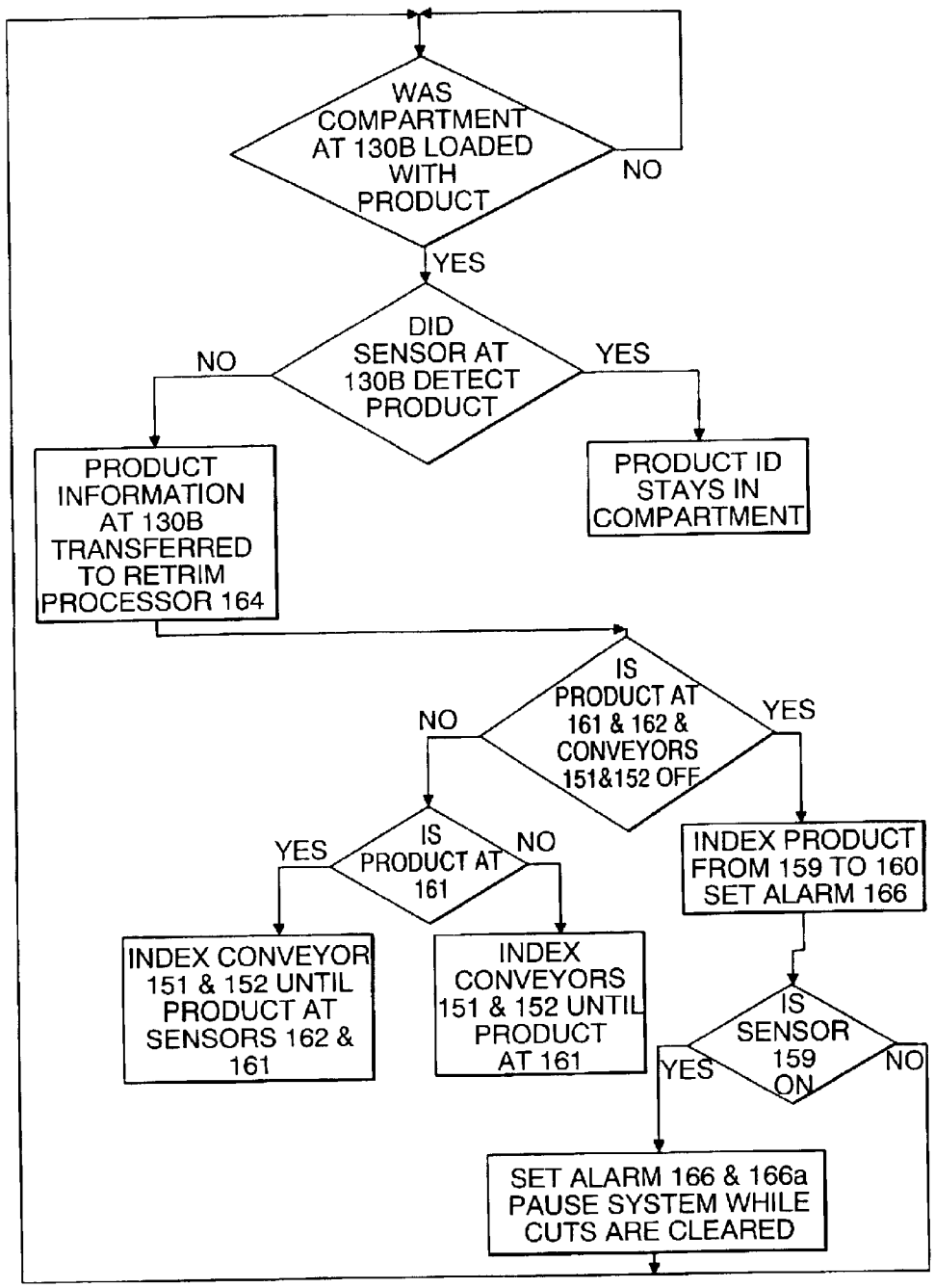
FIG. 29 is a flow chart showing the load sequence for the retrim conveyor shown in FIG. 22.

FIG. 29 displays some details of the control instructions flowchart for managing a retrimming procedure. This flow chart includes means for detecting the presence of a cut to be retrimmed (see 130B in FIG. 15) and for moving the conveyers 151, 152 forward until a cut is at position 161 (and another cut is at position 162, if there are two cuts). Sensor 159 detects when the apparatus 150 is over-full.

Figure 30:
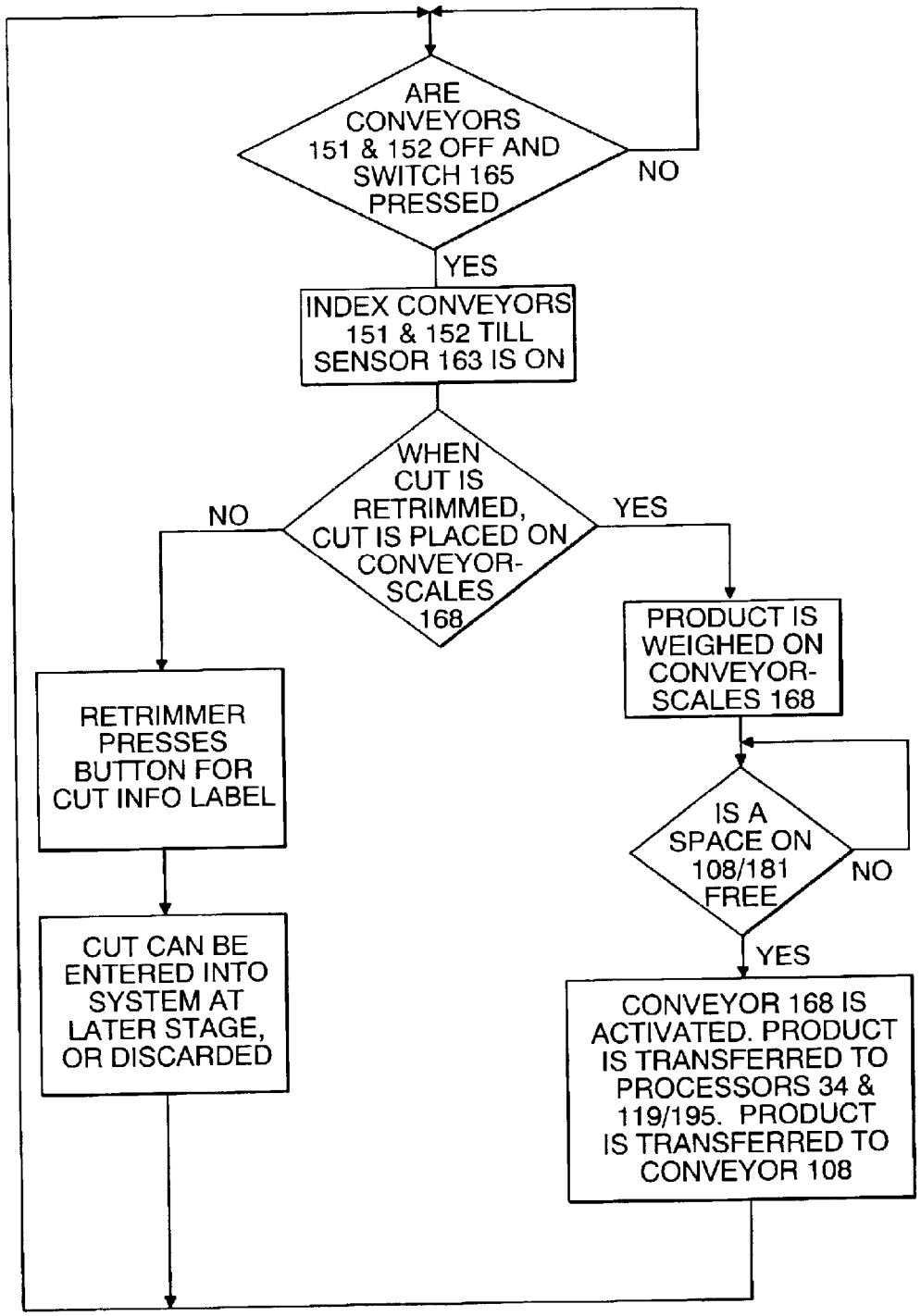
FIG. 30 is a flow chart showing the transfer sequence for the retrim conveyor.

FIG. 30 displays further details of the control instructions flowchart for managing a re-trimming procedure. The topmost decision box detects actuation of the operator controlled switch 165. If the conveyers 151, 152 were initially not moving this section causes the conveyer to move until sensor 163 detects a cut. Then, the operator re-trims the cut. The cut is weighed on scale 168 and then automatically re-transferred to the conveyer 181 using the next free compartment. Data (Product ID) is simultaneously transferred to the correct section of memory of processor 34; and also to the controller 195.

Figure 31:
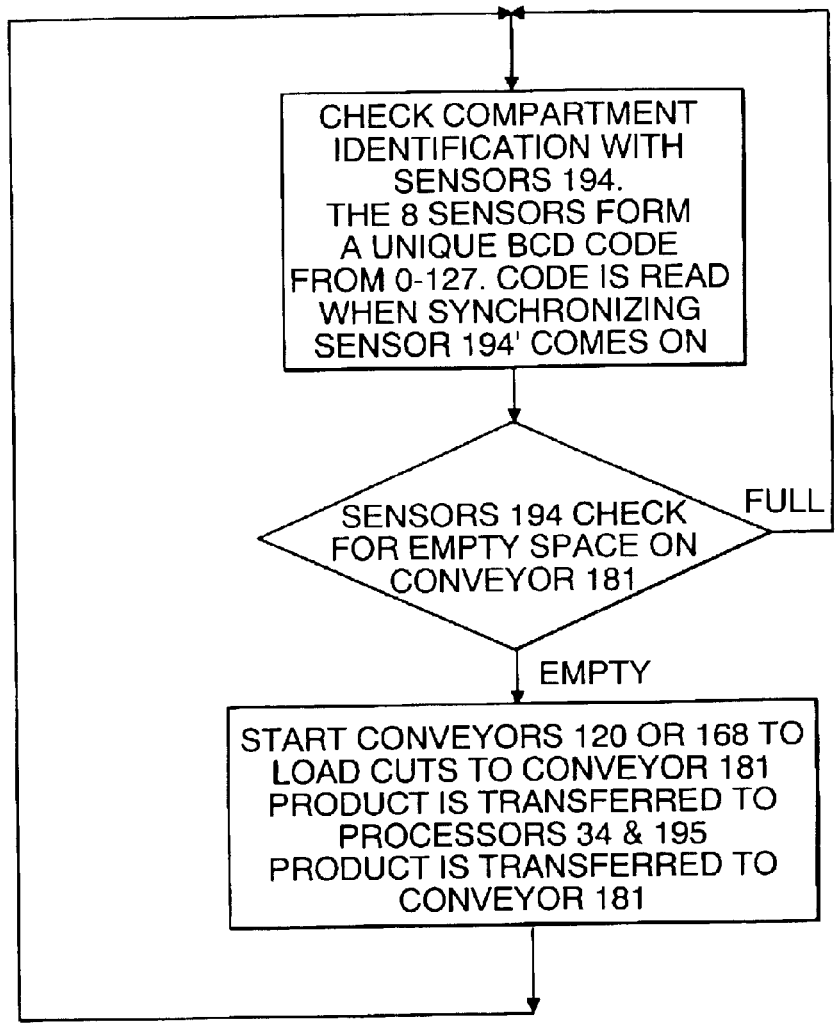
FIG. 31 is a flow chart showing a method for conveyor compartment identification, and meat-information transfer.

FIG. 31 displays some details of the control instructions for indexing the conveyer 181. Seven sensors 194 provide data in a code, and an eighth sensor 194' causes a read operation to take place to identify the cell of the conveyor. At about the same time, the procedure tests whether the cell is full or empty, using sensors 194. If it is full, the system goes on to read identity and status of the next cell; otherwise it endeavours to fill the cell, as the conveyor traverses the trimming tables, by energising the next example of conveyor 120 that holds a cut ("product"). Preferably the conveyors 120 are energised in the order in which cuts are placed thereon.

Figure 32:
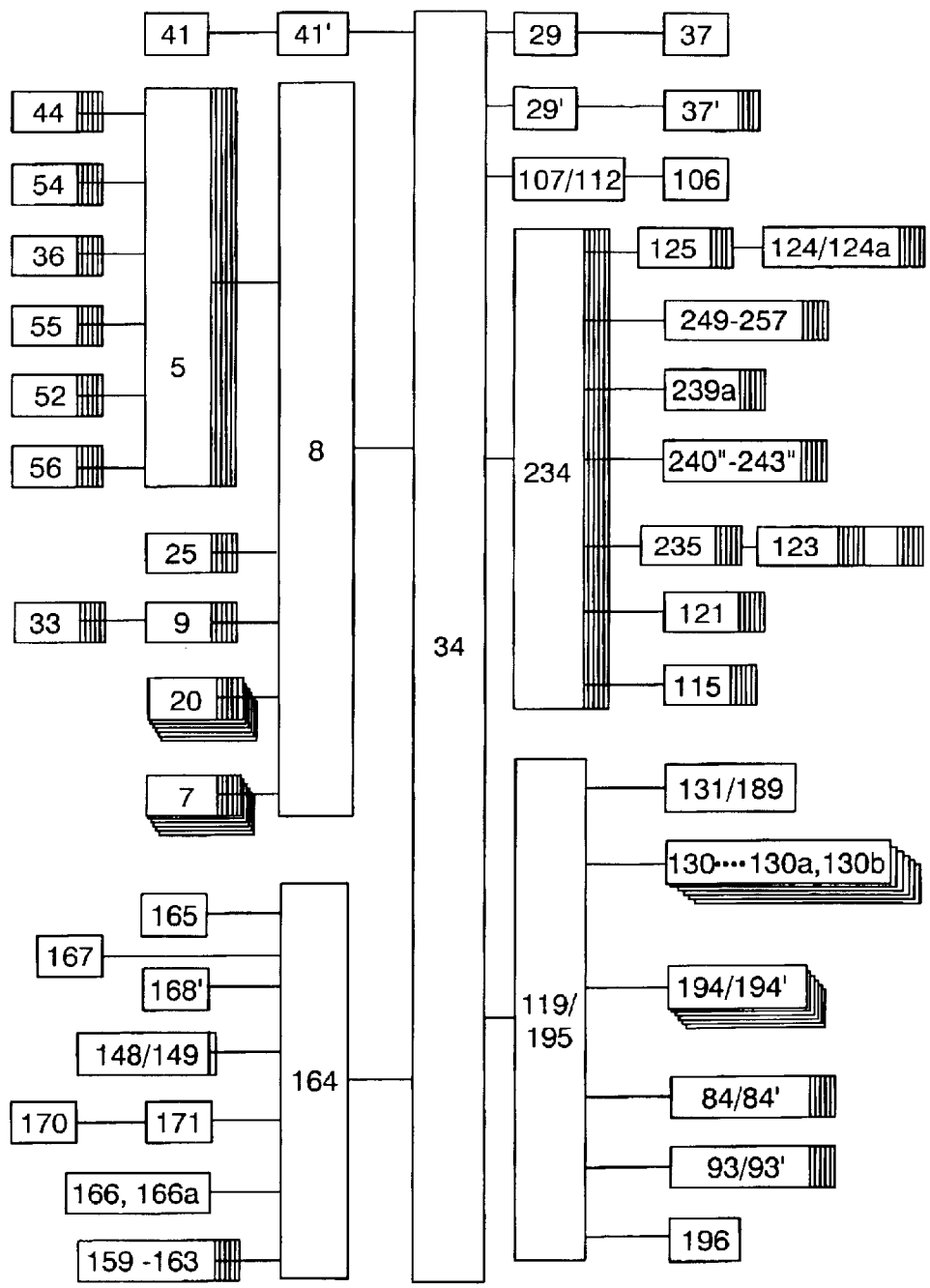
FIG. 32 is a diagram showing the connection of various components discussed in connection with FIGS. 7 and 15 with a central electronic processor.

FIG. 32 illustrates the connection of the field devices in the systems shown in FIGS. 7 and 15 with the processor 34. All connections to the processor are made through input or output modules through a six wire bus system.

Instead of the gate arrangement provided in the apparatus 59 described above, the size of the cut may be measured by a video image processing apparatus. The cuts may also be tested, by machine vision or the like, for factors such as type, colour, marbling and inadvertently remaining trimmings as well as size (i.e. width and thickness as well as length). Since the processor 34 will already know the type of each cut by its position on the conveyor, testing for type in the inspection tunnel may be superfluous. However such testing may be carried out for verification purposes.

The technology for such testing is commercially available. For example, video image processing apparatus which could be used for identifying the type of cut is available from Elrad Limited, an Israeli company. This and other sophisticated techniques such as dual-wavelength X-ray absorption or nuclear magnetic resonance may be employed to measure the ratio of fat to muscle (or water content) in the cut, and or other variables.

In any of the systems disclosed above, the bagging step could fully be automated.

It may not be appropriate to print all the details of a cut on its bag or label. Also, it may be desirable to identify the cut in the language of a country to which the meat is to be exported.

As far as the hardware of the monitoring system is concerned, the rate of data acquisition is not great in comparison with some process control applications. Nevertheless it will be clear to those skilled in the art that means must be provided to avoid the loss of data if, for example, several strings of information are input at the same time. Clearly the hardware (transducers, connections, output devices and the processor itself) should be reliable in what is a computer-hostile environment. Particular types of network or data bus are already adapted for this type of application. For example, an array of IBM-PC (TM) computers (including redundancy such as mirrored operation or a "voting" system where at least 2 computers must agree in case of failure) should be sufficient for the applications described herein. One of the two such computers could be used for report generation and the other for real-time data acquisition and responses such as label generation.

It may happen for a variety of reasons that the source carcass of a cut is misidentified. Such occasional misidentification should be tolerable since, in most cases, the average of yields of a large number of carcasses will be what is sought. The system can be programmed without difficulty to report means and standard deviations for each cut from a mob of animals put through the plant.

The following is a schedule of proprietary equipment suitable for use with the apparatus described herein:

The processor 34 may be an IBM (TM) compatible PC provided with a Phoenix Contact IBS PC CB/COP/I-T host controller board. A six wire bus system then runs from this board to the field devices such as an analogue input board or digital input output board such as a Phoenix Contact IBS SAB 24DIO 4/4/2. Of course, all digital (on-off signal) units would be connected to the processor via one of these units. Inputs include all capacitive sensors, inductive sensors, limit switches and pushbuttons. Outputs include valves, motor contactors and lamps. Phoenix Contact Inc is located in Harrisburg, Pa., USA.

The processor could have a Phoenix Contact programming language such as PC Worx to program the system. Information handling would be by a package such as Wonderware Intouch. This is a Supervisory Control and Data Acquisition (SCADA) package.

The bag producing machines 22 are available from Danaflex Packaging Corporation Limited of Wellington, New Zealand under the trade mark "Bagger".

The printer 36 in each bagger may be a Jaguar model J27c2 available from ITW Compular of Addlestone, United Kingdom.

A suitable solenoid valve 25 is model number MEH 3/24-4.0 available from available from Festo KG of Esslingen, Germany.

All scanners 37, 37', 41 may be identical. A suitable scanner is Jenlogix MS-265 connected to a Phoenix Contact Interbus Module IBS V.24 serial interface module.

Suitable load cells are available from Precision Transducers, a New Zealand company, model PT1260. Each such load cell will work through a Phoenix Contact Analogue Input Module IBS-AI 3 converter which has four analogue inputs. This converter has four inputs so only one converter is needed to handle the load cells 124, 124a, 123 in each magazine 239. The converter converts the analogue signal from the load cell to a signal which can be read by the STRFC controller. All controllers are daisy chained together along with a Phoenix Contact, PC Master Field Controller (ISA card) IBS-ISA-FC/IT which is situated in the processor 34.

A suitable model for all capacitive sensors, including sensors 194, 183 and 133, is Festo model SIE-M12 S-PS-S=LED.

A suitable model for all inductively actuated switches, including switches 84, is Festo model SIE-M 8 S-PS-S=LED.

A suitable model for all through-beam type sensors, including sensors 159–163 and 249–257, is model Festo SOE-S-Q-K-LED (transmitter) and SOE-E-Q-PS/O-K-LED (receiver).

All remote field controllers for the sensors and switches may be STRFC controllers available from the Phoenix Contact company.

It is not intended that the scope of a patent granted in pursuance of the application of which this specification forms a part should exclude modifications and/or improvements to and/or known equivalents of any matter described and/or illustrated herein which are within the scope of the invention as claimed or be limited by such matter further than is necessary to distinguish the invention from the prior art

What is claimed is:

1. A method of producing a bag for packaging a cut of meat comprising the steps of:
   providing a plurality of bag making devices for forming bags from rolls of plastic film, wherein each of said bag making devices is loaded with a different width of plastic film;
   acquiring size information for the cut of meat; and
   causing one of said plurality of bag making devices to form a bag based on said size information.

2. The method of claim 1 wherein said size information includes the length of said cut of meat.

3. The method of claim 1 wherein said size information includes the width of said cut of meat.

4. The method of claim 1 wherein said size information includes the height of said cut of meat.

5. The method of claim 1 wherein said size information includes the weight of said cut of meat.

6. A system for forming a bag for packaging a cut of meat comprising:
   a measuring device for acquiring size information for the cut of meat;
   a processor coupled to said measuring device for receiving said size information from said measuring device; and
   a plurality of bag making devices for forming bags from rolls of plastic film, wherein each of said bag making devices is loaded with a different width of plastic film, wherein said processor is coupled to said bag making devices and selectively causes one of said bag making devices to form a bag based on said size information.

7. The system of claim 6 wherein said measuring device comprises length determining means.

8. The system of claim 6 wherein said measuring device comprises width determining means.

9. The system of claim 6 wherein said measuring device comprises height determining means.

10. The system of claim 6 further comprising a conveyor for transferring the cut of meat from said measuring device to a position adjacent said bag making devices.

11. The system of claim 6 wherein said measuring device includes an array of light activated sensors for acquiring said size information.

12. The system of claim 6 wherein said measuring device includes a plurality of gates for acquiring the size information.

13. The system of claim 12 wherein said measuring device further includes inductively actuated switches activated by said plurality of gates.

14. The system of claim 6 wherein said measuring device includes weight determining means.

15. The system of claim 6 wherein said processor causes said size information to be printed on the bag formed by said bag making device.

16. A system for forming a bag to package a cut of meat comprising:
   a device for acquiring information about the cut of meat; and
   a processor for receiving said information coupled to said device; and
   a plurality of bag making devices for forming bags from rolls of plastic film, wherein each of said bag making devices is loaded with plastic film having a different characteristic, wherein said processor is coupled to said bag making devices and selectively causes one of said bag making devices to form a bag based on said information.

17. The system of claim 16 wherein said different characteristic is width.

18. The system of claim 16 wherein said information is the width of the cut of meat.

19. The system of claim 16 wherein said information is the height of the cut of meat.

20. The system of claim 16 further comprising a conveyor for transferring the cut of meat from said device to a position adjacent said bag making devices.

* * * * *